(12) United States Patent
Ikushima

(10) Patent No.: US 11,458,501 B2
(45) Date of Patent: Oct. 4, 2022

(54) LIQUID MATERIAL DISCHARGE DEVICE, AND APPLICATION DEVICE AND APPLICATION METHOD THEREFOR

(71) Applicant: MUSASHI ENGINEERING, INC., Mitaka (JP)

(72) Inventor: Kazumasa Ikushima, Tokyo (JP)

(73) Assignee: MUSASHI ENGINEERING, INC., Mitaka (JP)

(*) Notice: Subject to any disclaimer, the term of this patent is extended or adjusted under 35 U.S.C. 154(b) by 980 days.

(21) Appl. No.: 16/305,553

(22) PCT Filed: May 25, 2017

(86) PCT No.: PCT/JP2017/019503
§ 371 (c)(1),
(2) Date: Nov. 29, 2018

(87) PCT Pub. No.: WO2017/208956
PCT Pub. Date: Dec. 7, 2017

(65) Prior Publication Data
US 2021/0220863 A1    Jul. 22, 2021

(30) Foreign Application Priority Data
May 30, 2016  (JP) .............................. JP2016-107831

(51) Int. Cl.
*B05C 5/02*    (2006.01)
*B05C 11/10*   (2006.01)
(Continued)

(52) U.S. Cl.
CPC ............ *B05C 5/0225* (2013.01); *B05C 11/10* (2013.01); *B05C 5/00* (2013.01); *B05D 1/26* (2013.01); *F16K 1/42* (2013.01)

(58) Field of Classification Search
CPC ......... B05C 5/0225; B05C 5/00; B05C 11/10; B05D 1/26; F16K 1/42
See application file for complete search history.

(56) References Cited

U.S. PATENT DOCUMENTS

| 5,451,260 A | * | 9/1995 | Versteeg ........... C23C 16/45563 |
| | | | 427/314 |
| 5,747,102 A | | 5/1998 | Smith et al. |
| | | | (Continued) |

FOREIGN PATENT DOCUMENTS

| CN | 101743423 A | 6/2010 |
| CN | 102006943 A | 4/2011 |
| | (Continued) | |

OTHER PUBLICATIONS

Office Action dated Jun. 24, 2020, issued in counterpart CN Application No. 201780034025.5, with English Translation. (14 pages).

(Continued)

*Primary Examiner* — Patrick C Williams
(74) *Attorney, Agent, or Firm* — WHDA, LLP

(57) ABSTRACT

A liquid material discharge device and method capable of suppressing generation of bubbles caused with a rod raising operation in a negative pressure environment. In a liquid material discharge device used in a negative pressure space and including a storage container; a compressed-gas supply source pressurizing the storage container; a nozzle having a discharge flow path; a reciprocating valve rod; an actuator driving the valve rod; a valve seat having a communication hole that is communicated with the discharge flow path; and a discharge control device controlling the actuator to open and close the communication hole by a tip of the valve rod, the discharge control device controls an acceleration time $A_u$ in rising of the valve rod by the actuator to be held within (Continued)

a range of 2 to 300 [ms], thus preventing generation of bubbles caused with the rising of the valve rod.

21 Claims, 17 Drawing Sheets

(51) Int. Cl.
  *B05D 1/26* (2006.01)
  *F16K 1/42* (2006.01)
  *B05C 5/00* (2006.01)

(56) References Cited

U.S. PATENT DOCUMENTS

| | | | |
|---|---|---|---|
| 5,875,922 A * | 3/1999 | Chastine | B05C 5/0225 335/219 |
| 6,060,125 A | 5/2000 | Fujii | |
| 6,253,957 B1 | 7/2001 | Messerly et al. | |
| 6,267,266 B1 | 7/2001 | Smith et al. | |
| 6,484,885 B1 | 11/2002 | Lilie et al. | |
| 6,558,127 B2 | 5/2003 | Maruyama et al. | |
| 6,565,333 B2 | 5/2003 | Maruyama | |
| 6,679,685 B2 | 1/2004 | Maruyama et al. | |
| 7,134,617 B2 | 11/2006 | Ikushima | |
| 7,918,435 B2 * | 4/2011 | Page | G01G 17/04 251/129.11 |
| 8,757,449 B2 | 6/2014 | Ikushima | |
| 9,162,249 B2 | 10/2015 | Koyama et al. | |
| 9,889,463 B2 | 2/2018 | Ikushima | |
| 2001/0043864 A1 | 11/2001 | Maruyama et al. | |
| 2002/0025260 A1 | 2/2002 | Maruyama | |
| 2003/0012667 A1 | 1/2003 | Maruyama et al. | |
| 2003/0121836 A1 | 7/2003 | Lilie et al. | |
| 2004/0134996 A1 | 7/2004 | Kazumasa | |
| 2005/0001869 A1 * | 1/2005 | Abernathy | G05D 7/0629 347/17 |
| 2007/0001136 A1 * | 1/2007 | Everingham | F02M 26/54 251/77 |
| 2009/0001305 A1 | 1/2009 | Cook et al. | |
| 2009/0078799 A1 * | 3/2009 | Achleitner | F02D 41/20 239/585.5 |
| 2009/0212729 A1 | 8/2009 | Cook | |
| 2010/0080912 A1 | 4/2010 | Koyama et al. | |
| 2012/0217262 A1 | 8/2012 | Ikushima | |
| 2014/0374637 A1 | 12/2014 | Nakamura et al. | |
| 2015/0014362 A1 | 1/2015 | Ikushima | |
| 2016/0236228 A1 | 8/2016 | Ikushima | |

FOREIGN PATENT DOCUMENTS

| | | |
|---|---|---|
| CN | 104011444 A | 8/2014 |
| CN | 104668152 A | 6/2015 |
| JP | 10-151393 A | 6/1998 |
| JP | 11-197571 A | 7/1999 |
| JP | 2000-317369 A | 11/2000 |
| JP | 2001-113212 A | 4/2001 |
| JP | 2001-246298 A | 9/2001 |
| JP | 2002-21715 A | 1/2002 |
| JP | 2002-513674 A | 5/2002 |
| JP | 2002-282740 A | 10/2002 |
| JP | 2005-211874 A | 8/2005 |
| JP | 2006-281178 A | 10/2006 |
| JP | 2007-111862 A | 5/2007 |
| JP | 2008-008232 A | 1/2008 |
| JP | 2010-87320 A | 4/2010 |
| KR | 10-2014-0006135 A | 1/2014 |
| KR | 10-2014-0093749 A | 7/2014 |
| WO | 2011/037139 A1 | 3/2011 |
| WO | 2013/118669 A1 | 8/2013 |
| WO | 2015/046481 A1 | 4/2015 |

OTHER PUBLICATIONS

English translation of International Preliminary Report on Patentability issued in counerpart International Application No. PCT/JP2017/019503. (9 pages).

International Search Report dated Aug. 29, 2017, issued in counterpart International Application No. PCT/JP2017/019503. (3 pages).

Office Action dated Apr. 19, 2021, issued in counterpart KR Application No. 10-2018-7031927. (5 pages).

* cited by examiner

LIQUID MATERIAL DISCHARGE DEVICE, AND APPLICATION DEVICE AND APPLICATION METHOD THEREFOR

TECHNICAL FIELD

The present invention relates to a device and a method for discharging a liquid material in a negative pressure environment. In this Description, it is assumed that the term "negative pressure environment" includes a vacuum environment.

BACKGROUND ART

If bubbles are present in a liquid resin (liquid material) in a step (such as potting or underfilling) of applying the liquid material to a substrate to which a semiconductor component and so on are mounted, various adverse influences occur; for example, a discharge amount varies, a shape and a position of the applied liquid material are not constant (namely, drawing lines become disordered), the liquid material is scattered because the bubbles are ejected at the same time as when the liquid material is discharged, and the extra liquid material adheres to the surroundings of a discharge port of a nozzle.

As one example of methods for removing the above-mentioned adverse influences of the bubbles, there is known a method of placing the liquid material in a vacuum environment for degassing. According to the most general degassing method, prior to starting work, a container (syringe) containing the liquid material and actually used in the work is put as it is into another enclosed container, and the enclosed container is evacuated into a vacuum state for degassing of the liquid material. As for another method, there is proposed an application device having an inner space in which application of the liquid material is performed, the inner space being formed as an enclosed space and evacuated into a vacuum state for degassing of the liquid material.

For example, Patent Document 1 discloses a liquid material application device including a storage-discharge unit that stores a liquid material and discharges the liquid material through a discharge port, and applying the liquid material to an application target, wherein the application device further includes an application space surrounding at least the storage-discharge unit and the application target, and an evacuation system evacuating the application space into a negative pressure state, and wherein the liquid material is discharged toward the application target from the storage-discharge unit while the application space is held in the negative pressure state.

Patent Document 2 discloses a vacuum application device including a vacuum chamber in which a target product for application of a liquid resin is disposed, and applying the liquid resin in a vacuum state to a predetermined position of the application target product from a dispenser that is a supply source of the liquid resin, wherein the vacuum chamber containing the application target product is constituted by a first container portion containing and supporting the application target product, and a second container portion to which a nozzle of the dispenser is attached, wherein the first container portion and the second container portion are constituted to be relatively movable in an X-Y plane without breaking an airtight state of the vacuum chamber, and wherein an X-Y driver moving at least one of the first and second container portions in the X-Y plane and causing a relative planar positional relation between the application target product and the nozzle to be variable is installed outside the vacuum chamber.

CITATION LIST

Patent Documents

Patent Document 1: Japanese Patent Laid-Open Publication No. 2005-211874
Patent Document 2: Japanese Patent Laid-Open Publication No. 2007-111862

SUMMARY OF INVENTION

Technical Problem

In a discharge device including a reciprocating valve rod (plunger), when application work is performed using a discharge device disposed in a negative pressure space, a problem arises in that liquid pressure near a tip of the valve rod reduces and bubbles generate with an operation of raising the valve rod. If the bubbles generate near the tip of the valve rod, the above-mentioned problems occur; for example, the drawing lines become disordered and the liquid material is scattered at the time of discharge due to the presence of the bubbles.

An object of the present invention is to provide a liquid material discharge device and method capable of suppressing generation of bubbles caused with the operation of raising a valve rod in a negative pressure environment.

Another object of the present invention is to provide a liquid material discharge device and method capable of solving the problem of leakage of a liquid material, which may occur as a result of insufficient closing by a tip of the valve rod due to wear of the tip of the valve rod or a valve seat.

Solution to Problem

The present invention provides, according to a first aspect, a liquid material discharge device used in a negative pressure space, the liquid material discharge device comprising a storage container storing a liquid material, a compressed-gas supply source pressurizing the storage container, a nozzle having a discharge flow path, a reciprocating valve rod, an actuator driving the valve rod, a valve seat having a communication hole that is communicated with the discharge flow path, and a discharge control device controlling the actuator to open and close the communication hole by a tip of the valve rod, wherein the discharge control device controls an acceleration time $A_u$ in rising of the valve rod by the actuator to be held within a range of 2 to 300 [ms], thus preventing generation of bubbles caused with the rising of the valve rod.

In the above liquid material discharge device, the discharge control device may control a target speed $V_1$ in the rising of the valve rod by the actuator to be held within a range of 0.2 to 30 [mm/s].

In the above liquid material discharge device, the discharge control device may control an acceleration time $A_d$ in lowering of the valve rod by the actuator to be held within a range of 2 to 300 [ms]. In this case, the discharge control device may set the acceleration time $A_u$ in the rising of the valve rod and the acceleration time $A_d$ in the lowering of the valve rod by the actuator to be the same.

In the above liquid material discharge device, the actuator may be driven by using, as a drive source, a motor capable of controlling an advanced position of the valve rod with the discharge control device. In this case, the actuator may be driven by using, as the drive source, one selected from among a stepping motor, a servomotor, and a linear motor. Additionally, the liquid material discharge device may further comprise a position detection mechanism detecting that the tip of the valve rod is at a valve-seat closing position.

The present invention provides, according to a second aspect, a liquid material discharge device comprising a storage container storing a liquid material, a compressed-gas supply source pressurizing the storage container, a nozzle having a discharge flow path, a reciprocating valve rod, an actuator driving the valve rod, a valve seat having a communication hole that is communicated with the discharge flow path, and a discharge control device controlling the actuator to open and close the communication hole by a tip of the valve rod, wherein the liquid material discharge device further comprises a position detection mechanism detecting that the tip of the valve rod is at a position closing the valve seat.

In the above liquid material discharge device according to the second aspect, the actuator may be driven by using, as a drive source, a motor capable of controlling an advanced position of the valve rod with the discharge control device. In this case, the actuator may be driven by using, as the drive source, one selected from among a stepping motor, a servomotor, and a linear motor.

In the above liquid material discharge device including the position detection mechanism, the position detection mechanism may comprise a slide member connected to the actuator, a slider connected to the slide member, a sensor mechanism detecting that the slide member is at a predetermined position, a rod conjunction member connected to the valve rod and arranged in contact with the slide member in a separable manner, and an elastic member applying biasing force to keep the rod conjunction member and the slide member contacted with each other in a separable manner, wherein, when force acting to further advance the valve rod is applied by the actuator after the valve rod has come into contact with the valve seat, the slide member is moved downward away from the rod conjunction member, and the tip of the valve rod being at the position closing the valve seat is detected by detecting the downward movement of the slide member with the sensor mechanism.

In the above liquid material discharge device including the rod conjunction member, the rod conjunction member may be connected to the slider, and the elastic member may be a tension coil spring coupling the rod conjunction member and the slide member. In this case, the elastic member may have tensile force Pi equivalent to force that is able to move the rod conjunction member and the slide member when the valve rod and the valve seat are not in contact with each other.

In the above liquid material discharge device including the rod conjunction member, the slide member may have a top surface including a first through-hole through which the valve rod is inserted, and a bottom surface including a second through-hole through which the valve rod is inserted, the rod conjunction member and the elastic member may be arranged between the top surface and the bottom surface of the slide member, and the elastic member may keep the rod conjunction member contacted with the top surface or the bottom surface of the slide member in a separable manner. In this case, the liquid material discharge device may further comprise a fixing member through which the valve rod is inserted and which fixedly holds the rod conjunction member, and the elastic member may be a compression coil spring through which the valve rod is inserted. Additionally, the elastic member may have repulsive force Pii equivalent to force that is required to move the valve rod, the rod conjunction member, and the fixing member.

The above liquid material discharge device may further comprise a first guide member through which the valve rod is inserted, and which guides straight movement of the valve rod, and a second guide member through which the valve rod is inserted, and which guides the straight movement of the valve rod at a position lower than the first guide member. In this case, the liquid material discharge device may further comprise a third guide member through which the valve rod is inserted, and which guides the straight movement of the valve rod at a position lower than the second guide member.

The present invention further provides an application device comprising the above liquid material discharge device, a worktable on which a workpiece is to be placed, a relative driving device moving the liquid material discharge device and the worktable relatively to each other, a cover constituting a negative pressure space in which the liquid material discharge device, the worktable, and the relative driving device are arranged, a depressurization device producing negative pressure inside the cover, and a drive control device controlling the relative driving device.

In the above application device, the depressurization device may be a vacuum pump.

The present invention still further provides an application method using the above application device, wherein the liquid material is applied onto the workpiece while the workpiece and the liquid material discharge device are moved relatively to each other in a state that an inner space of the cover is held under negative pressure by the depressurization device.

In the above application method, the inner space of the cover may be substantially under a vacuum.

Advantageous Effects of Invention

According to the present invention, since generation of bubbles caused with the operation of raising the valve rod is suppressed, it is possible to avoid the problems, for example, that the drawing lines become disordered and the liquid material is scattered at the time of discharge.

Since the liquid material is fed under pressure using the compressed gas and the communication hole is opened and closed by the valve rod, the liquid material can be stably discharged at a high speed (high flow rate) with good response.

Furthermore, in the present invention including the position detection mechanism, closing by the tip of the valve rod can be reliably ensured even when wear of the valve rod tip or the valve seat occurs.

BRIEF DESCRIPTION OF THE DRAWINGS

In FIG. 15, (a) is a front view, and (b) is a sectional view taken along a line D-D in (a) when viewed in a direction denoted by arrow.

In FIG. 16, (a) is a front view, and (b) is a sectional view taken along a line E-E in (a) when viewed in a direction denoted by arrow.

DESCRIPTION OF EMBODIMENTS

Figure 1:
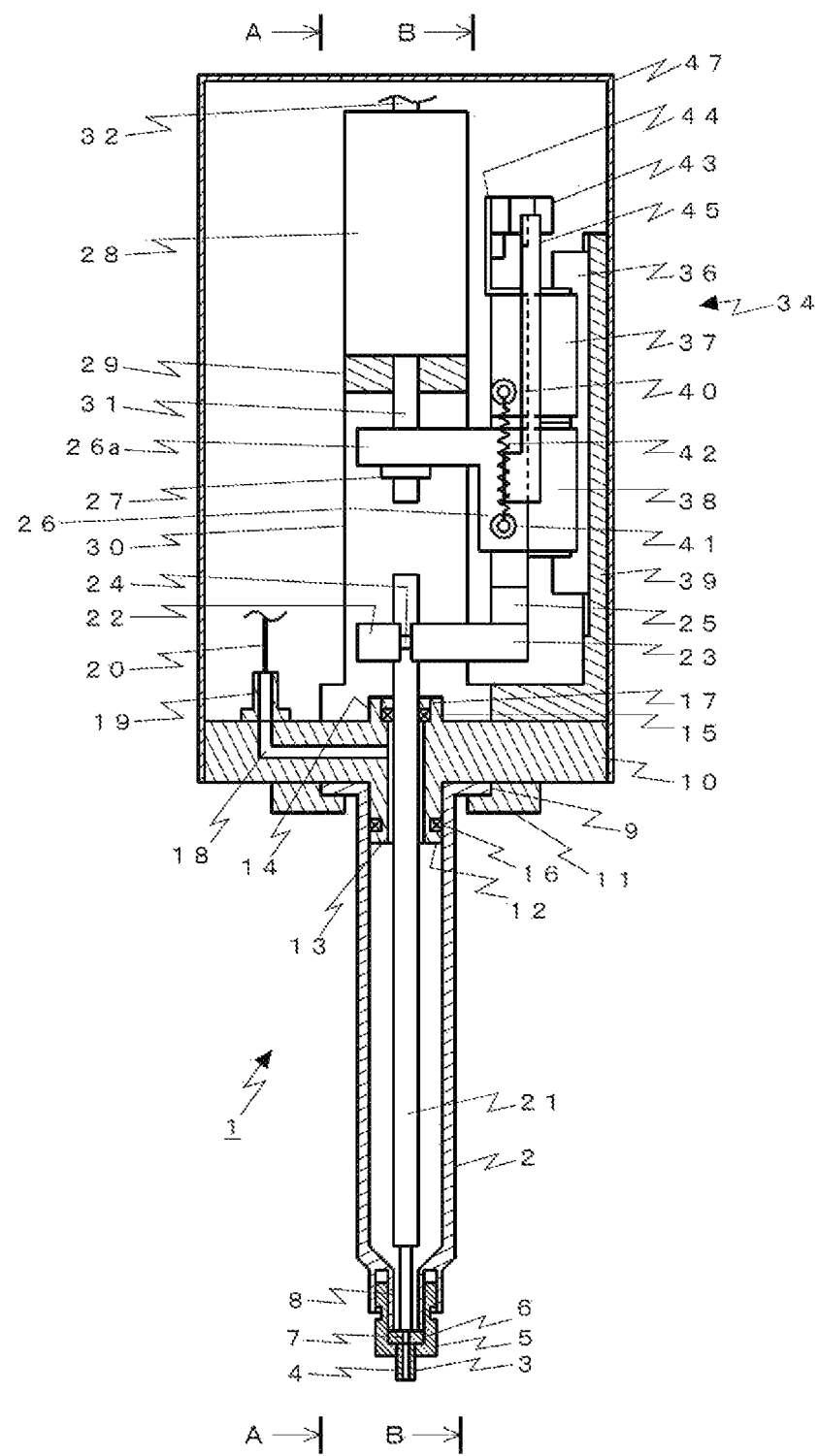
FIG. 1 is a partial sectional side view of a discharge device according to a first embodiment.

Embodiments for carrying out the present invention will be described below.

First Embodiment

A discharge device 1 according to a first embodiment of the present invention is a discharge device of the type that a liquid material is discharged by opening a communication hole 7 in a valve seat 6 with an operation of raising a valve rod 21, and that discharge of the liquid material is stopped by closing the communication hole 7 with an operation of lowering the valve rod 21. The discharge device 1 is used in a negative pressure space in a state mounted to an application device 101. The discharge device 1 can prevent generation of bubbles by adjusting a speed and an acceleration of the valve rod 21 by controlling an operation of an electric actuator 28 with a discharge control device 33. The discharge device 1 includes a position detection mechanism 34 for detecting a position where the valve rod 21 comes into contact with the valve seat 6. Thus, the communication hole 7 in the valve seat 6 can be reliably closed even when wear of the valve rod 21 or the valve seat 6 occurs.

In the following, a structure of the discharge device 1 is first described, and an operation of the discharge device 1 is then described.

<Structure>

Figure 2:
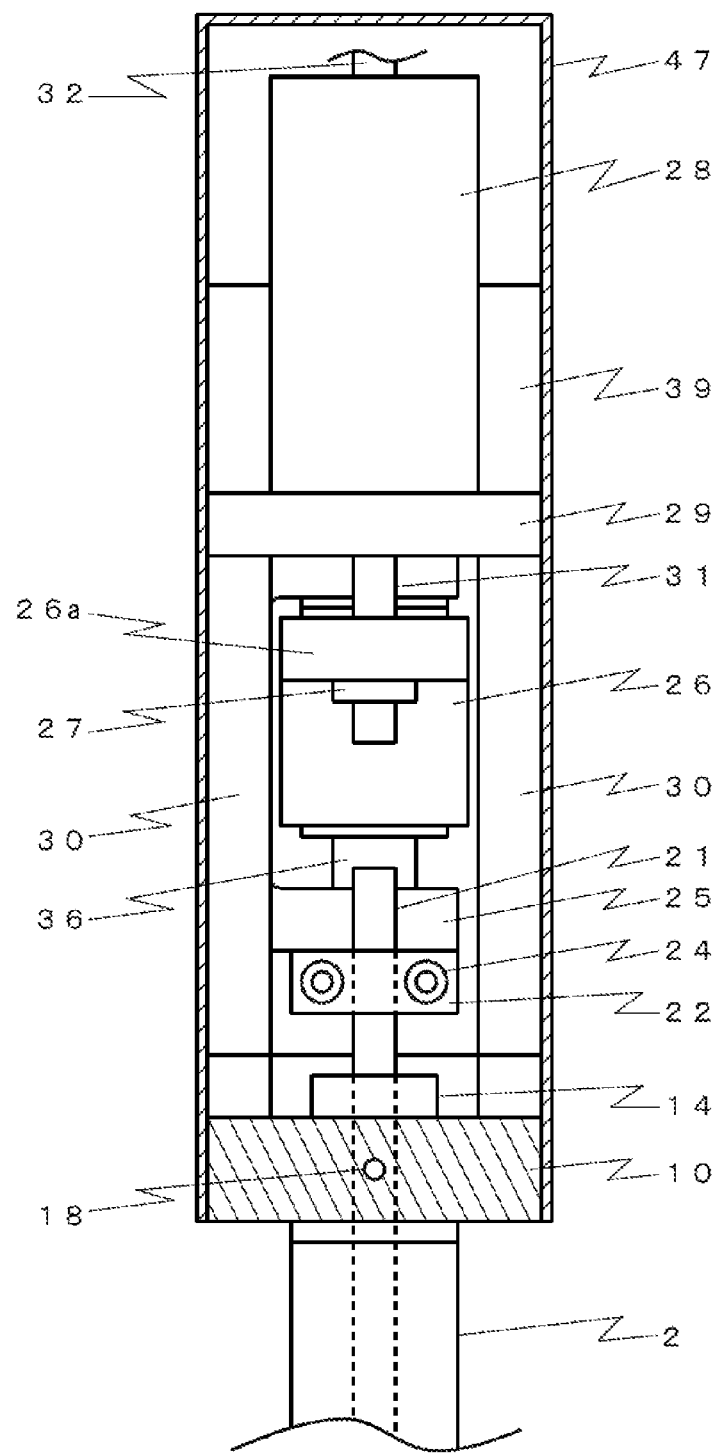
FIG. 2 is a sectional view taken along a line A-A in FIG. 1 when viewed in a direction denoted by arrow.
Figure 3:
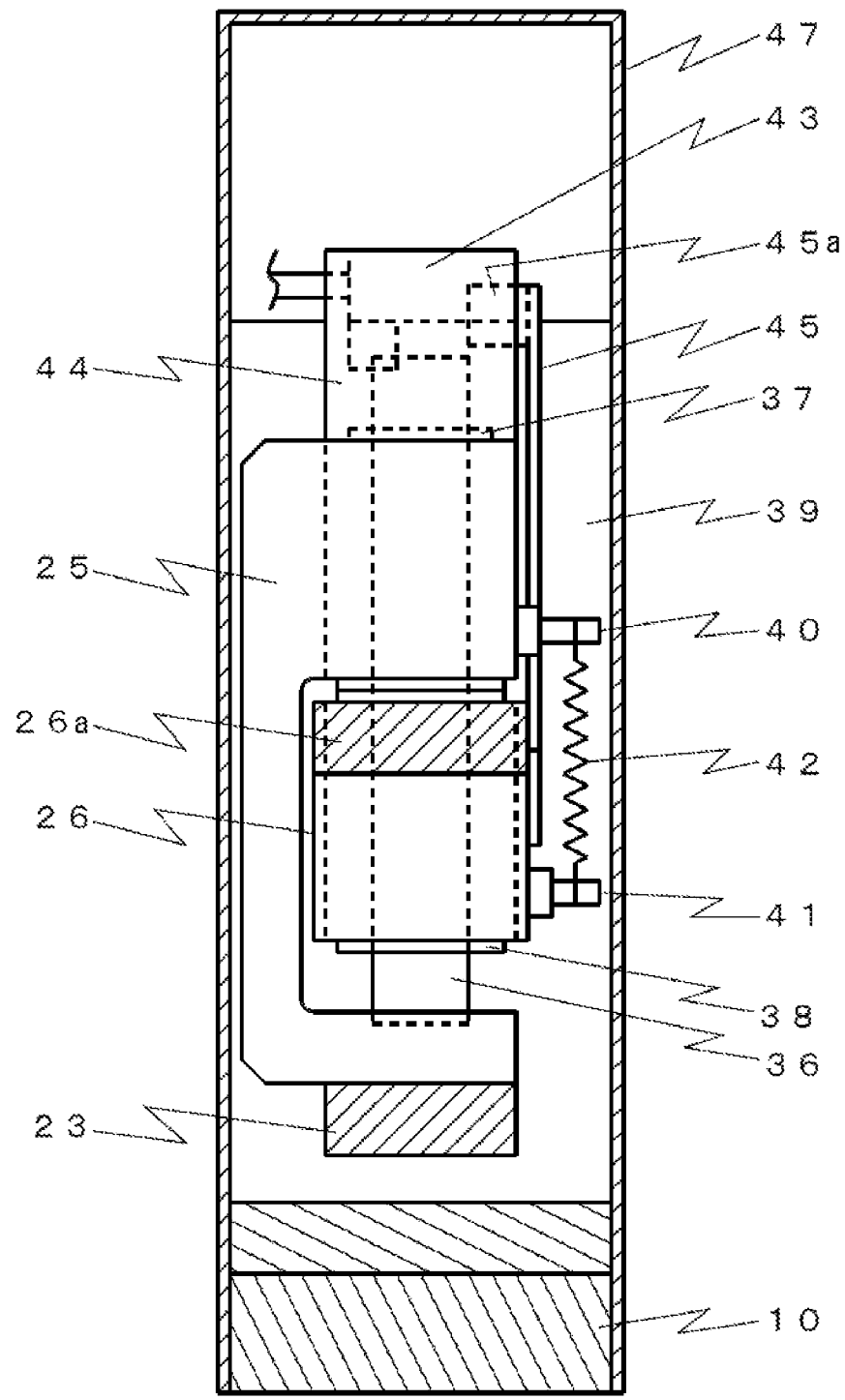
FIG. 3 is a sectional view taken along a line B-B in FIG. 1 when viewed in a direction denoted by arrow.

FIG. 1 is a partial sectional side view of the discharge device 1 according to the embodiment of the present invention. FIG. 2 is a sectional view taken along a line A-A in FIG. 1 when viewed in a direction denoted by arrow, and FIG. 3 is a sectional view taken along a line B-B in FIG. 1 when viewed in a direction denoted by arrow. In the following description, the side including the actuator 28 is called the "upper side", and the side including the nozzle 3 is called the "lower side" in some cases. Moreover, a viewing point of FIG. 1 is expressed by "when viewed from front", and a viewing point of FIGS. 2 and 3 is expressed by "when viewed from side" in some cases.

The discharge device 1 includes a storage container (syringe) 2, a nozzle 3, a nozzle attachment member 5, the valve seat 6, a body lower member 10, and the position detection mechanism 34.

The storage container 2 used in the first embodiment is a general resin-made syringe having a flange 9 at an upper end and an inner tube 8 at a lower end. The valve rod 21 is inserted through the storage container 2, and an inner space of the inner tube 8 defines a rod-tip insertion hole. The nozzle attachment member 5, the valve seat 6, and the nozzle 3 are attached to the inner tube 8.

The nozzle 3 is a pipe-like member, and an inner space of the nozzle 3 defines a discharge flow path 4. The nozzle attachment member 5 is screwed into the lower end of the syringe 2, whereby the syringe 2 and the discharge flow path 4 in the nozzle 3 are communicated with each other via the valve seat 6.

The nozzle attachment member 5 is a cylindrical member, and it has, in a bottom portion, a through-hole into which the nozzle 3 is inserted.

The valve seat 6 is fitted to a recess in the nozzle attachment member 5, and is fixedly held in a state sandwiched between the nozzle attachment member 5 and the inner tube 8 at the lower end of the syringe 2. The valve seat 6 is positioned at a lowermost edge of the syringe 2, and it has the communication hole 7 for communicating the syringe 2 and the discharge flow path 4 in the nozzle 3 with each other.

The body lower member 10 is a plate-like member arranged at a lower end of a head cover 47 in which the actuator 28 and upper and lower slide blocks (37, 38) are accommodated. A flange support member 11 having a hook-like shape is disposed at a lower surface of the body lower member 10, and it holds the flange 9 formed at the upper end of the syringe 2. An insertion portion 12 having a circular columnar shape and having substantially the same diameter as an inner diameter of the syringe 2 is provided at a lower surface of the body lower member 10, and is fitted into the syringe 2. A sealing member B 16 is disposed around an outer periphery of the insertion portion 12 to prevent leakage of compressed gas. A through-hole 13 through which the valve rod 21 is inserted is vertically formed at centers of the body lower member 10 and the insertion portion 12.

An annular sealing member A 15 to prevent leakage of the compressed gas is disposed near an upper end of the through-hole 13, and the valve rod 21 is inserted through the sealing member A 15. Because an inner diameter of the through-hole 13 is greater than a diameter of the valve rod 21, an outer peripheral surface of the valve rod 21 contacts only the sealing member A 15 and does not contact an inner peripheral surface of the through-hole 13. A seal retainer 17 for fixedly holding the sealing member A 15 is provided at the upper end of the through-hole 13. While, in this embodiment, the upper end of the through-hole 13 forms a projected portion 14 that is projected upward from the body lower member 10 by a distance corresponding to both the sealing member A 15 and the seal retainer 17, the present invention is not limited to that configuration. In another example, the sealing member A 15 may be disposed such that the body lower member 10 has a flat upper surface.

A compressed-gas flow path 18 is communicated with a lateral surface of the through-hole 13, thus allowing the compressed gas supplied through the compressed-gas flow path 18 to be introduced into the syringe 2. The compressed-gas flow path 18 is a flow path formed inside the body lower member 10 and having an L-like shape in cross-section, and is opened at an upper surface of the body lower member 10. A gas supply joint 19 having a compressed-gas supply port is fitted to the opening of the compressed-gas flow path 18. The compressed-gas, such as atmosphere gas, nitrogen gas, or carbon dioxide gas, is supplied to the gas supply joint 19 from a compressed-gas supply source (not illustrated) via a compressed-gas supply pipe 20. The liquid material (having viscosity of, for example, 0.1 to 5 Pa·S) stored in the syringe 2 is pressurized to, for example, 300 to 500 kPa by the supplied compressed gas. While, in this embodiment, the compressed-gas flow path 18 is bent inside the body lower member 10 and is opened at the upper surface of the body lower member 10, the present invention is not limited to that configuration. The compressed-gas flow path 18 may be opened at a lateral or lower surface of the body lower member 10.

A lower end portion of the valve rod 21 extends while penetrating the through-hole 13 and is positioned inside the syringe inner tube 8 (i.e., near the valve seat 6), and an upper end portion of the valve rod 21 extends upward of the upper surface of the body lower member 10 and reaches a position facing the actuator 28. The lower end portion of the valve rod 21 has a smaller width (diameter) than the syringe inner tube 8, and a gap between an inner wall of the inner tube 8 and a lateral peripheral surface of the valve rod 21 is filled with the liquid material. The valve rod 21 in this embodiment is constituted by a step-formed rod having a smaller diameter near its lower end, but the present invention is not limited to such an example. The valve rod 21 may have a smaller diameter portion depending on the diameter of the communication hole 7 in the valve seat 6 in some cases, and may have no smaller diameter portion in other cases. That type of valve rod is also called a valve needle or a plunger.

The valve rod 21 is connected at its upper portion to the actuator 28 via rod holders (22, 23), and is linearly moved in a reciprocal manner by the action of the actuator 28.

The actuator 28 is attached, in an upper space within the head cover 47, to an actuator attachment plate 29 coaxially with the valve rod 21. The actuator attachment plate 29 is bridged between upper ends of two actuator support plates 30 that are disposed in opposing relation with both an actuator rod 31 and the valve rod 21 positioned therebetween. While, in this embodiment, the actuator 28 and the valve rod 21 are arranged coaxially with each other, axes of the actuator 28 and the valve rod 21 may be not coaxial in another embodiment.

The actuator rod 31 operated to be capable of extending and contracting penetrates through the actuator attachment plate 29 and further extends downward. A lower end portion of the actuator rod 31 is joined to a horizontal portion 26a of a drive transmission member by a fixing member 27. The drive transmission member 26 is a member having an L-like shape when viewed from front, and the horizontal portion 26a is connected to the lower end portion of the actuator rod 31. A vertical portion of the drive transmission member 26, which is perpendicular to the horizontal portion 26a, is coupled to the lower slide block 38.

For example, a stepping motor, a servomotor, or a linear motor can be used as the actuator 28. Using such a motor as the actuator 28 is to control a speed and an acceleration in operation of the valve rod 21 driven by the actuator 28. In this embodiment, the actuator 28 is constituted by a stepping motor equipped with a resolver, and the speed and the acceleration in operation of the valve rod 21 are controlled. A control wiring 32 for communication with the discharge control device 33, which controls operation of the actuator 28, is connected to an upper end portion of the actuator 28.

The position detection mechanism 34 is mainly constituted by the two slide blocks (37, 38), an elastic member 42, a sensor 43, and a detection plate 45. A slide rail 36 is mounted, in a state extending vertically, to a slide attachment plate 39 having an L-like shape in a sectional view such that the two slide blocks (37, 38) are movable over the slide rail 36 (see FIG. 1). With the two slide blocks (37, 38) moving over the slide rail 36, a lower surface of the upper slide block 37 and an upper surface of the lower slide block 38 are in positional relation coming into contact with each other or departing away from each other. The upper slide block 37 functions as a rod conjunction member that is moved in conjunction with the valve rod 21, and that departs away from the lower slide block 38 by the action of predetermined force.

An upper portion of a coupling member 25 is coupled to the upper slide block (rod conjunction member) 37, and the upper slide block 37 is connected to the valve rod 21 via the coupling member 25. The coupling member 25 has a "C"-like shape or "["-like shape when viewed from side, and the lower slide block 38 is arranged in a recess formed in the coupling member 25 (see FIG. 3). The rod holder B 23 for holding the valve rod 21 is attached to a lower end of the coupling member 25. The rod holder A 22 is detachably fixed to the rod holder B 23 by fasteners 24.

The valve rod 21 is fixedly held by tightening the fasteners 24 and grasping the valve rod 21 in a state sandwiched between the two rod holders (22, 23). Ordinary screws are used as the fasteners 24 in this embodiment, but another type of fastening part may also be used. With the above-described structure, the valve rod 21 can be easily attached in a detachable manner, and maintenance work is facilitated.

An L-shaped attachment plate 44 to which the sensor 43 is fixed is attached to an upper end of the upper slide block 37. A photosensor is used as the sensor 43 in this embodiment, but another type of sensor, such as a fiber sensor, a photoelectric sensor, or a vicinity sensor (of high-frequency oscillation type or electrostatic type), may also be used.

The drive transmission member 26 connected to the actuator rod 31 and having an L-like shape when viewed from front is attached to a lateral surface of the lower slide block 38. The detection plate 45 is mounted to a lateral (front) surface of the lower slide block 38 perpendicular to the lateral surface thereof to which the drive transmission member 26 is attached. The detection plate 45 has, in an upper portion, a folded portion 45a to actuate the sensor 43 (see FIG. 3). In this embodiment, the sensor 43 detects movement of the valve rod 21 in response to motion of the folded portion 45a intercepting an optical axis of the photosensor 43 or allowing light to pass therethrough.

An upper pin 40 is disposed at a front surface of the upper slide block 37, and a lower pin 41 is disposed at a front surface of the lower slide block 38. The elastic member (spring) 42 is disposed between the two pins (40, 41). The elastic member 42 is a tension coil spring and has tensile force Pi equivalent to the force that is required to move the upper slide block 37 and the other associated components (including the coupling member 25, the valve rod 21, and the sensor 43) over the slide rail 36. The elastic member 42 acts to keep the upper slide block 37 and the lower slide block 38 contacted with each other.

The components on the upper side of the body lower member 10 are covered with the head cover 47. This is intended to protect an operator from touching movable components, and to prevent release of dust from the movable components and intrusion of dust to the movable components.

<Operations>

(Raising Operation)

Figure 4:
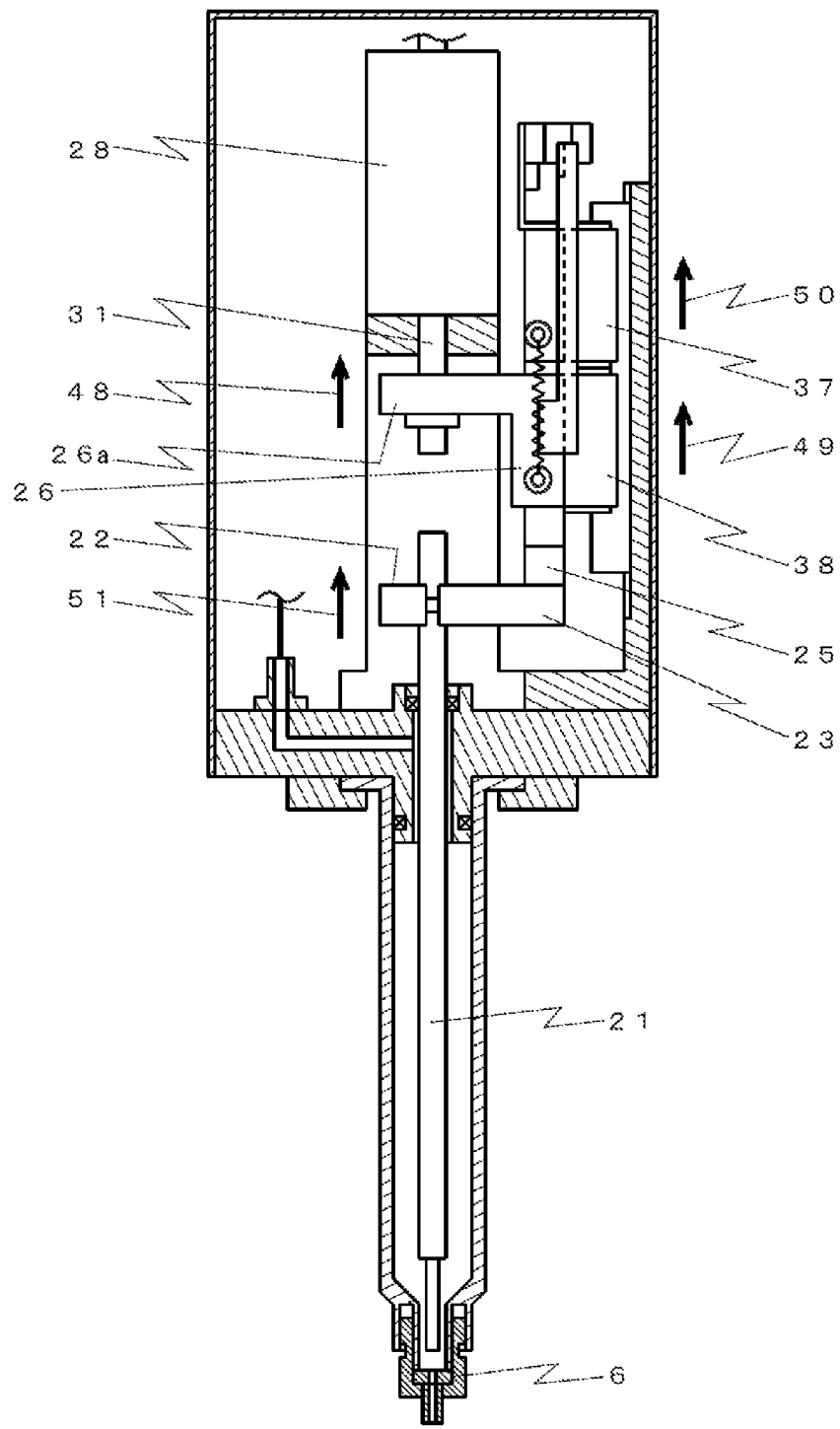
FIG. 4 is an explanatory view referenced to explain an operation of raising a valve rod in the discharge device according to the first embodiment.
Figure 5:
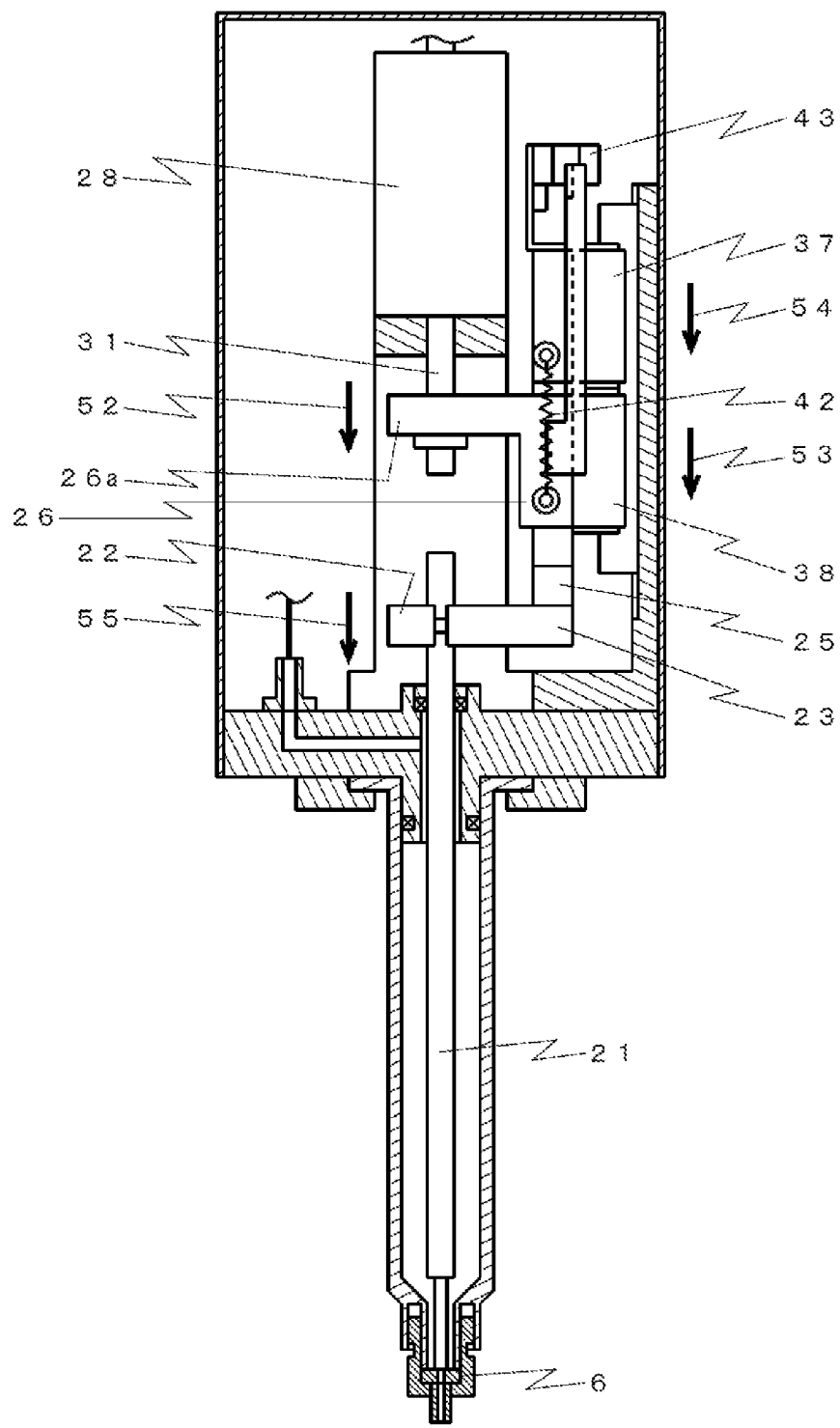
FIG. 5 is an explanatory view referenced to explain an operation of lowering the valve rod in the discharge device according to the first embodiment.
Figure 6:
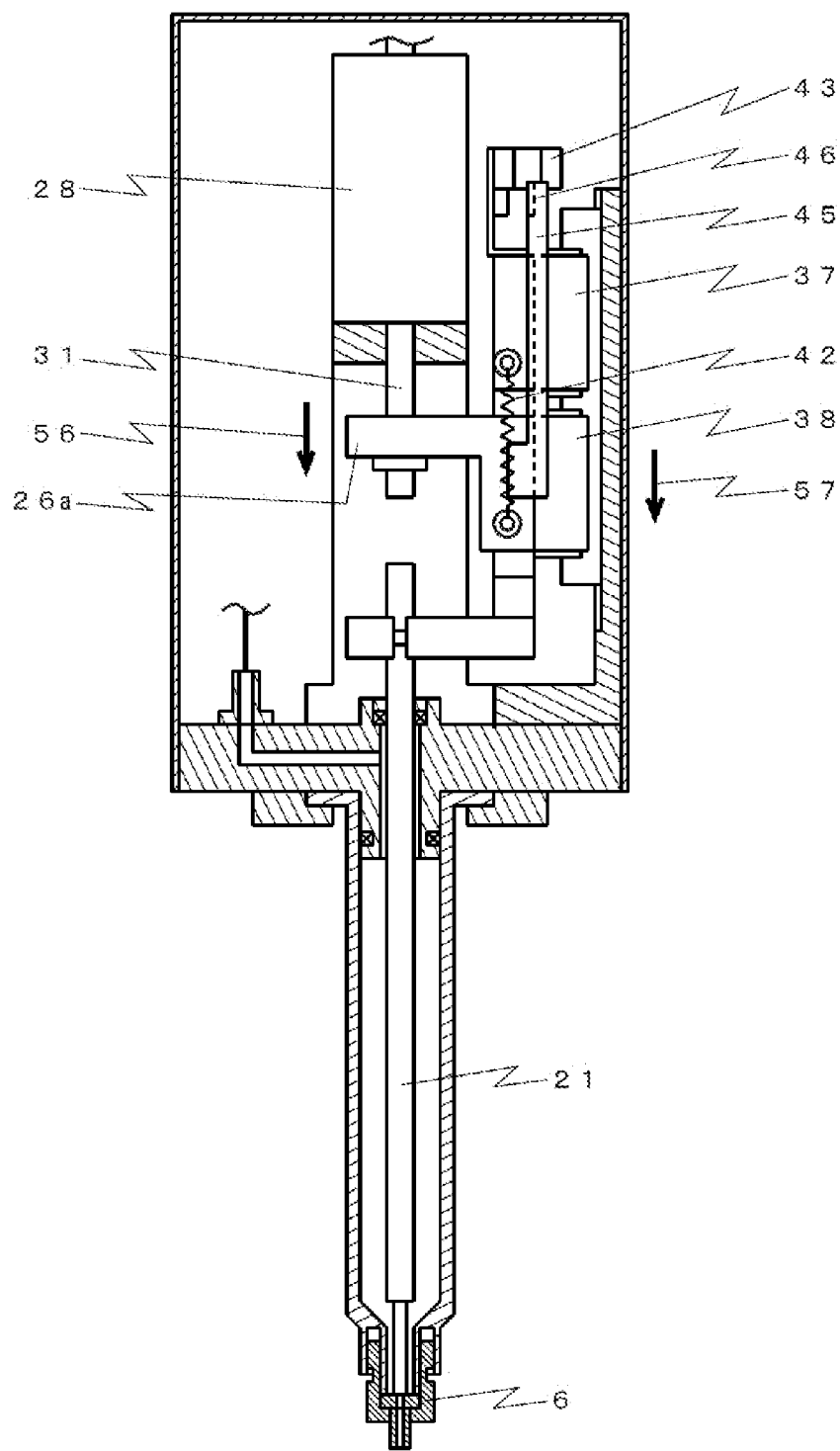
FIG. 6 is an explanatory view referenced to explain an operation of detecting contact of the valve rod in the discharge device according to the first embodiment.

Operations of the discharge device 1 according to the embodiment of the present invention will be described below with reference to FIGS. 4, 5 and 6.

First, an operation of raising the valve rod 21 from a position where the lower end of the valve rod 21 contacts the valve seat 6 is described with reference to FIG. 4. When the actuator 28 is operated to contract the actuator rod 31 (as denoted by numeral 48), the lower slide block 38 rises (as denoted by numeral 49) together with the drive transmission member 26. Since the upper surface of the lower slide block 38 contacts the lower surface of the upper slide block 37, the rising of the lower slide block 38 pushes up the upper slide block 37 (as denoted by numeral 50). Therefore, the coupling member 25 coupled to the upper slide block 37 and the rod holders (22, 23) coupled to the lower end of coupling member 25 rise, thus causing the valve rod 21 held by the rod holders (22, 23) to rise (as denoted by numeral 51). With rising of the valve rod 21, as illustrated in FIG. 4, the lower end of the valve rod 21 departs away from the valve seat 6, and the liquid material having passed through the discharge flow path 4 flows out from the discharge port.

(First Lowering Operation)

An operation of lowering the valve rod 21 until the lower end of the valve rod 21 contacts the valve seat 6 is now described with reference to FIG. 5. When the actuator 28 is operated to extend the actuator rod 31 downward (as denoted by numeral 52), the lower slide block 38 lowers together with the drive transmission member 26 (as denoted by numeral 53). Since the lower slide block 38 is coupled to the upper slide block 37 by the spring 42, the upper slide block 37 also lowers by the action of the spring 42 (as denoted by numeral 54). Here, the strength (Pi) of the spring 42 is set to be equivalent to the force that is required to move the upper slide block 37 and the other associated components (including the coupling member 25, the valve rod 21, and the sensor 43) over the slide rail 36. Therefore, the spring 42 is substantially not extended, and the upper slide block 37 is moved in a state kept contacted with the lower slide block 38. With lowering of the upper slide block 37, the coupling member 25 and the rod holders (22, 23) coupled to the lower end of coupling member 25 also lower, thus causing the valve rod 21 held by the rod holders (22, 23) to lower (as denoted by numeral 55). Accordingly, as illustrated in FIG. 5, the lower end of the valve rod 21 comes into contact with the valve seat 6, and the communication between the discharge flow path 4 and the storage container 2 is cut off, whereby the liquid material is stopped from flowing out from the discharge port. Ordinary discharge work is performed by repeating the raising operation and the first lowering operation.

(Second Lowering Operation)

A lowering operation of bringing the position of the valve rod 21 into a safely closed position is now described with reference to FIG. 6. Even after the lower end of the valve rod 21 has come into contact with the valve seat 6, the actuator rod 31 continues to extend downward with further extension of the actuator 28 (as denoted by numeral 56). With lowing of the drive transmission member 26, the lower slide block 38 also lowers (as denoted by numeral 57), but lowering of the upper slide block 37 is limited by the valve rod 21 having come into contact with the valve seat 6. Therefore, as the lower slide block 38 lowers, the folded portion 45a of the detection plate coupled to the lower slide block 38 lowers and departs away from the sensor 43. Upon detecting such a state, the sensor 43 sends a detection signal to the discharge control device 33. The discharge control device 33 stores, as an initial detected position (or a contact position), a position where the folded portion 45a of the detection plate departs away from the sensor 43.

When only the lower slide block 38 lowers in the state that the lower end of the valve rod 21 contacts the valve seat 6 as described above, the spring 42 coupling the upper slide block 37 and the lower slide block 38 is extended to generate force acting to pull down the upper slide block 37. That force acts as force pressing the valve rod 21 against the valve seat 6 via coupling member 25, thereby bringing the actuator rod 31 into the safely closed position where it is further lowered from the initial detected position by a predetermined distance. Thus, since the discharge control device 33 causes the valve rod 21 to be positioned at the safely closed position, closing of the valve seat 6 by the valve rod 21 is ensured. In this embodiment, the safely closed position is set to a position apart by 1 mm, for example, from the initial detected position. The above-described second lowering operation is performed when there is a long time until the next discharge work (i.e., in a long standby mode).

While this embodiment is designed so as to further lower the valve rod 21 from the initial detected position where the folded portion 45a of the detection plate departs away from the sensor 43, the position of the detection plate 45 may be adjusted such that the detection plate 45 departs away from the sensor 43 at a position where the spring 42 is extended by a certain length after the lower end of the valve rod 21 has come into contact with the valve seat 6 and then has further lowered. The position detection mechanism 34 may also be constituted without using the sensor 43. The contact position of the valve rod 21 may be detected, for example, by detecting a rotation angle or a movement amount of a motor shaft with the aid of an encoder, for example, which is attached to the motor for the actuator 28, and by utilizing an advanced or retracted position of the valve rod 21, which is obtained from the detected rotation angle or movement amount.

<Control of Acceleration Time>

In this embodiment, a drop of liquid pressure caused near the lower end of the valve rod 21 and generation of bubbles due to the drop of liquid pressure are suppressed by controlling a rising speed and an acceleration (acceleration and deceleration times in this embodiment) in the operation of raising the valve rod 21 by the actuator 28.

Figure 17:
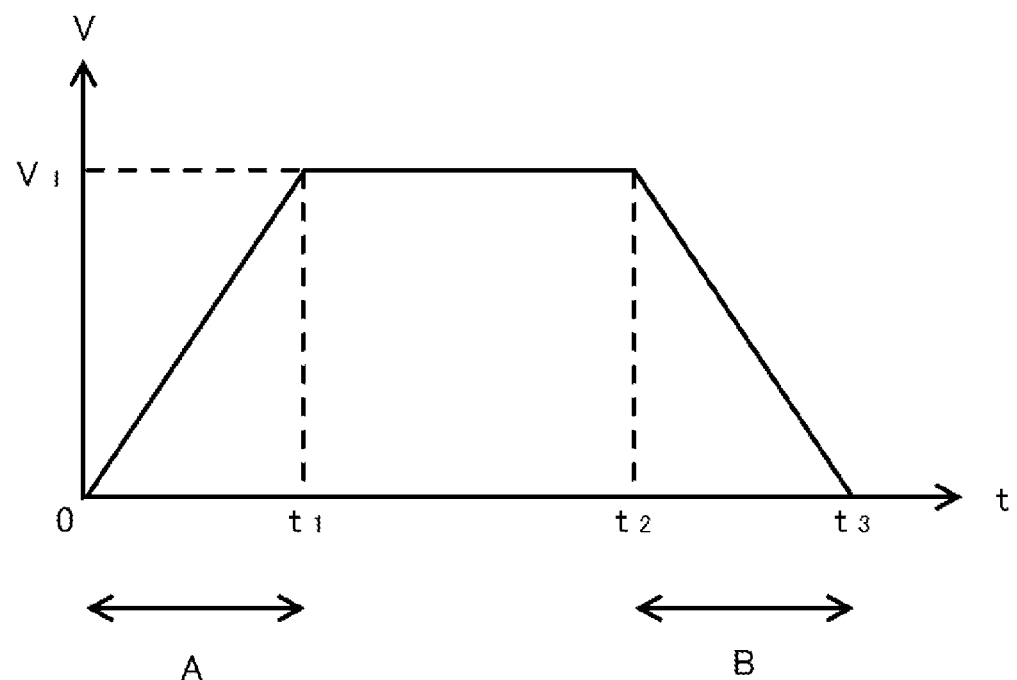
FIG. 17 is a graph (diagram) referenced to explain acceleration and deceleration times when the valve rod is raised.

FIG. 17 is a graph (diagram) referenced to explain acceleration and deceleration times when the valve rod is raised. A vertical axis V represents speed, and a horizontal axis t represents time. When t is zero, the valve rod 21 is at the initial detected position (contact position), and the upward moving speed V is zero. In FIG. 17, A denotes an acceleration time, and B denotes a deceleration time. If a rising-mode acceleration time $A_u$ until reaching a target speed $V_1$ is smaller than a certain value, the problem of bubble generation occurs. As a result of conducting discharge experiments using an underfill material, it has been confirmed that the liquid material can be discharged without generating bubbles under discharge conditions that the target speed $V_1$ is, for example, 0.2 to 30 [mm/s] (preferably 0.5 to 20 [mm/s]) and the rising-mode acceleration time $A_u$ is, for example, 2 to 300 [ms] (preferably 5 to 200 [ms]). In a related-art device, the liquid material is discharged under conditions that the target speed $V_1$ is about 10 times the above-mentioned values and the acceleration time A is about 1/10 time the above-mentioned values.

A rising-mode deceleration time $B_u$ is set to the same value as the rising-mode acceleration time $A_u$, or a value within the allowable range (e.g., 2 to 300 [ms]) of the acceleration time.

A lowering-mode acceleration time $A_d$ and a lowering-mode deceleration time $B_d$ in the operation of lowering the valve rod 21 are set to the same values as the rising-mode acceleration time $A_u$ and the rising-mode deceleration time $B_u$, respectively, or values within the allowable range (e.g., 2 to 300 [ms]) of the acceleration time. The lowering operation as quick as in the related-art device is not preferable because of causing an uncontrollable increase of the discharge amount.

(Discharge Operation)

A liquid material discharge operation including the above raising operation and lowering operation is as follows.

First, the compressed-gas is supplied from the compressed-gas source to the gas supply joint 19 via the compressed-gas supply pipe 20, thus pressurizing the liquid material stored in the syringe 2 via the compressed-gas flow path 18 and the through-hole 13. When the actuator 28 receives a discharge start signal from the discharge control device 33, the valve rod 21 is raised in accordance with the controlled speed and the controlled acceleration and deceleration times, whereby the liquid material is discharged from the discharge port. After the lapse of a time corresponding to the desired discharge amount, upon receiving a discharge end signal from the discharge control device 33, the actuator 28 lowers the valve rod 21 and closes the communication hole 7 in the valve seat 6 by the lower end of the valve rod 21 (first lowering operation). The foregoing is one cycle of basic discharge operation. Pressure of the supplied compressed-gas, a rising distance of the valve rod 21, a valve open time, etc. are appropriately set depending on physical properties and states (such as viscosity and temperature) of the liquid material used. The diameter and length of the nozzle 3, the diameter of the communication hole 7 in the valve seat 6, etc. can also be changed depending on conditions.

As described above, in the discharge device 1 according to this embodiment in which the liquid material is discharged by moving the valve rod 21 up and down to open and close the communication hole 7 in the valve seat 6, which is communicated with the discharge flow path 4 of the nozzle 3 attached to the end of the syringe 2, the generation of bubbles in the inner tube 8 (i.e., in the rod-tip insertion hole) due to a pressure drop, which is caused with rising of the valve rod 21, can be avoided by using the electric actuator 28 capable of adjusting the speed and the acceleration (or the acceleration and deceleration times) in the rising and lowering movements of the valve rod 21, and by appropriately controlling those parameters. As a result, it is possible to solve the problems, for example, that the discharged liquid material is scattered and the drawing lines become disordered due to the presence of the bubbles in the liquid material.

Furthermore, since the discharge device 1 has the structure utilizing the existing syringe and allowing the valve rod 21 to be easily attached and detached, maintenance work, such as cleaning and assembly, is easy to carry out.

Moreover, since the liquid material is fed under pressure using the compressed gas and the opening and closing operations are performed by the valve rod 21, the liquid material can be stably discharged at a high speed (high flow rate) with good response.

In addition, with the provision of the position detection mechanism 34, closing of the communication hole 7 in the valve seat 6 by the lower end of the valve rod 21 can be reliably ensured. When wear of the valve rod 21 or the valve seat 6 occurs, there is a risk that the communication hole 7 cannot be positively closed and the liquid material may leak. On the other hand, when the valve rod 21 is excessively pressed against the valve seat 6, there is a risk that the valve seat 6 may be broken. In the first embodiment, since the contact position between the lower end of the valve rod 21 and the valve seat 6 is accurately detected by the position detection mechanism 34, the risk of leakage of the liquid material is eliminated even after long-time use.

[Application Device]

Figure 7:
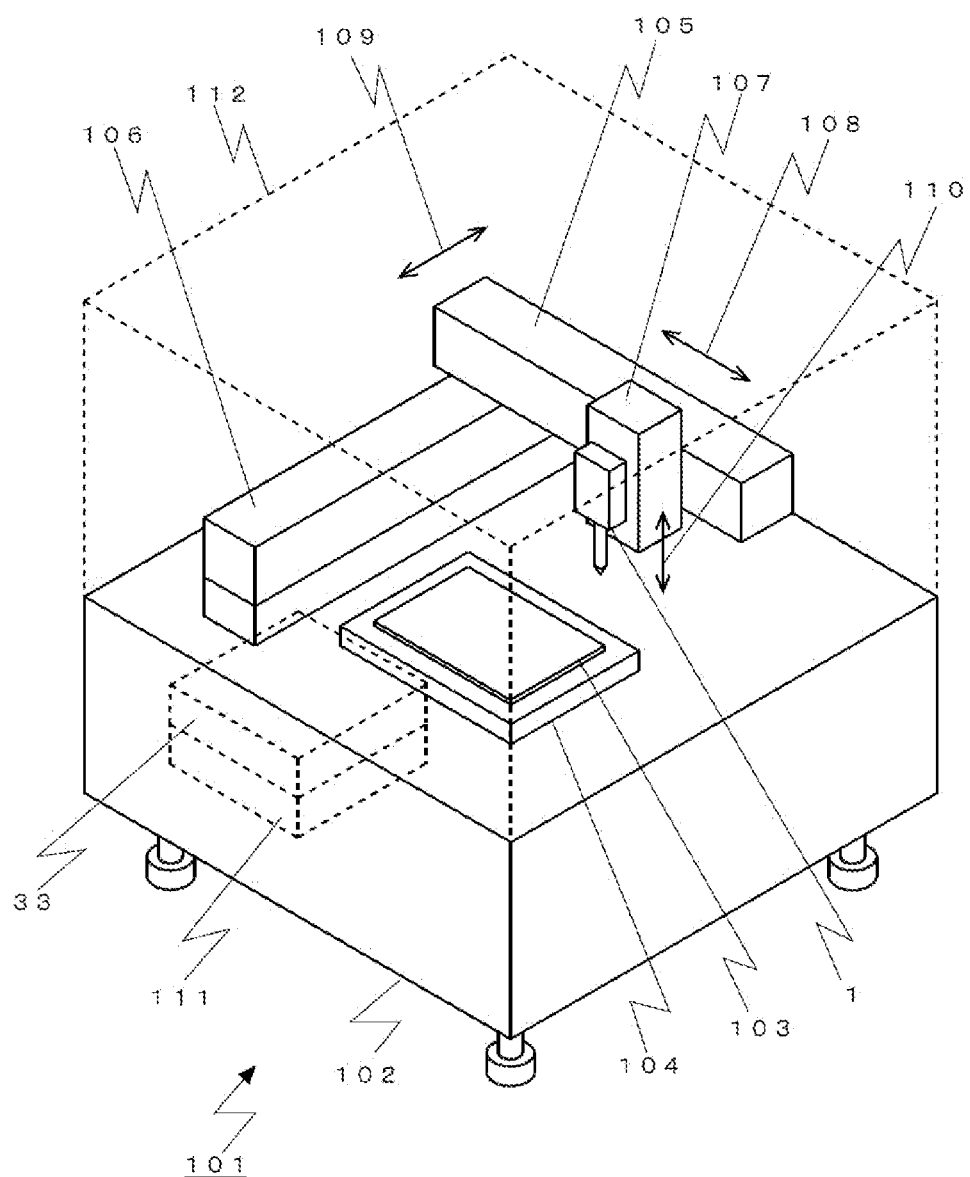
FIG. 7 is a schematic perspective view of an application device according to the first embodiment.

FIG. 7 is a schematic perspective view of an application device 101 including the discharge device 1 according to the first embodiment.

The application device 101 according to the first embodiment includes, on a base 102, a table 104 on which a workpiece 103, i.e., an application target, is to be placed, as well as an X driving device 105, a Y driving device 106, and a Z driving device 107 for moving the above-described discharge device 1 relatively to the workpiece 103. The relative driving devices (105, 106, 107) are movable in directions denoted by numerals 108, 109 and 110, respectively. The discharge control device 33 for controlling the above-described operations of the discharge device 1 and a drive control device 111 for controlling operations of the driving devices (105, 106, 107) are disposed inside the base 102. A space above the base 102 is surrounded by a cover 112 denoted by dotted lines, and an inner space of the cover can be brought into a negative pressure environment using a not-illustrated vacuum pump, for example. The cover 112 may include a door allowing an access to the inner space. Although the inner space is brought into the negative pressure environment in this embodiment, the application work may be performed under atmospheric pressure.

Second Embodiment

Figure 8:
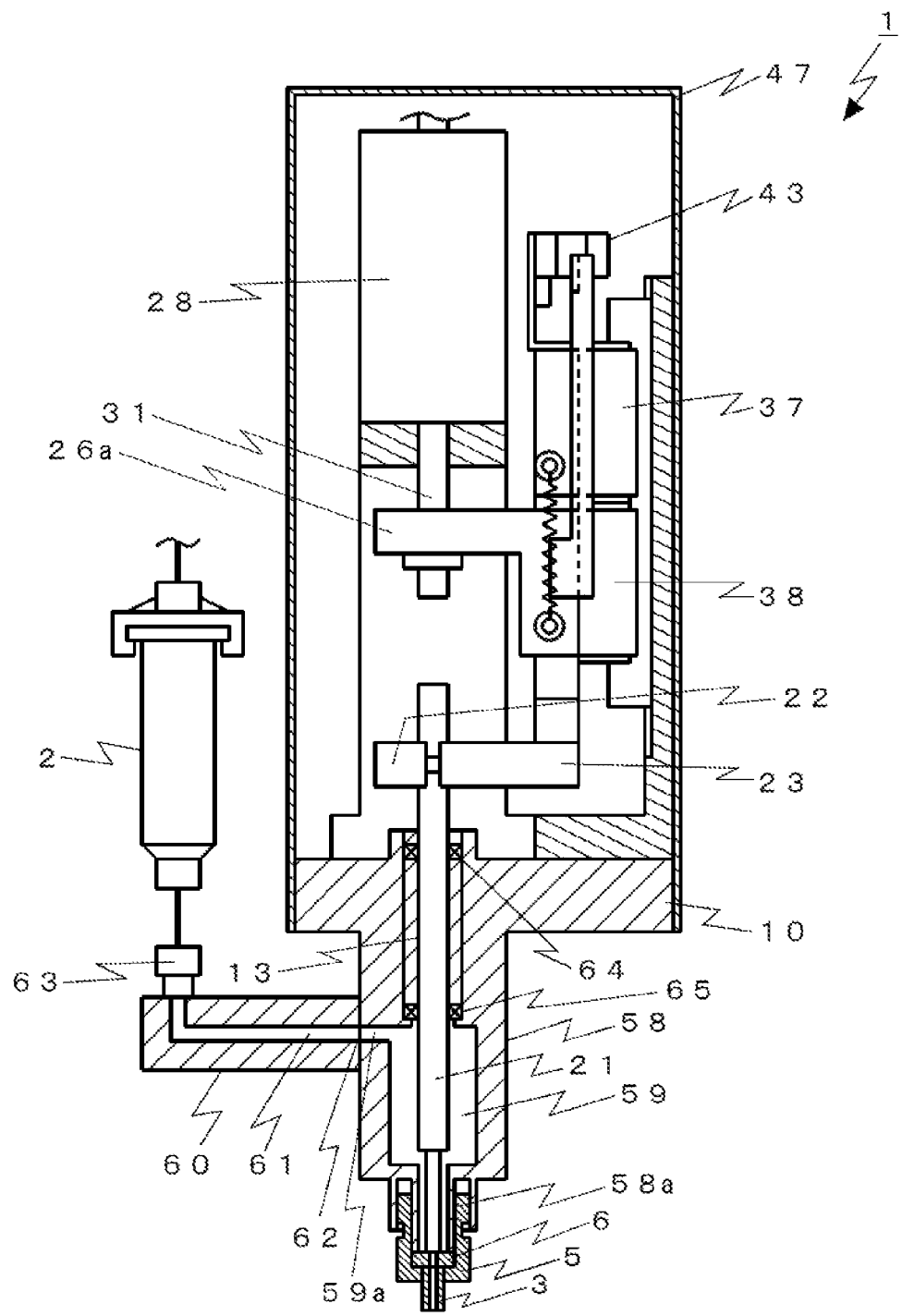
FIG. 8 is a partial sectional side view of a discharge device according to a second embodiment.

A liquid material discharge device 1 according to a second embodiment, illustrated in FIG. 8, is mainly different from the first embodiment in that the storage container 2 is constituted by, instead of a syringe into which the valve rod 21 is inserted, a syringe connected using an extension member 60. In the following, different points from the first embodiment are mainly described, and description of common elements is omitted in some cases.

A valve rod driving system (i.e., components above the body lower member 10) inside the head cover 47 is similar to that in the first embodiment. With the actuator 28 vertically reciprocating the actuator rod 31, the valve rod 21 is also vertically reciprocated via the drive transmission member 26, the upper slide block 37, and the lower slide block 38.

The body lower member 10 in the second embodiment is different from that in the first embodiment in including an extended portion 58 continuously extended downward. The body lower member 10 and the extended portion 58 may be constituted integrally with each other, or constituted by joining different members to each other.

The body lower member 10 and the extended portion 58 have a through-hole 13 extending in the vertical direction. A lower end of the through-hole 13 is fluidly connected to a liquid chamber 59 that is wider than the through-hole 13 formed in the extended portion 58. Annular sealing members C 64 and D 65 for preventing leakage of the liquid material are arranged in the through-hole 13.

The liquid chamber 59 is constituted by a large-diameter space and a small-diameter space positioned under the large-diameter space, and a lower half portion of the valve rod 21 is arranged in the liquid chamber 59. More specifically, an end part of a large-diameter portion of the valve rod 21 is arranged in the large-diameter space of the liquid chamber 59, and an end part of a small-diameter portion of the valve rod 21 is arranged in the small-diameter space of the liquid chamber 59. The large-diameter space and the small-diameter space constituting the liquid chamber 59 are wider than the end parts of the large-diameter and small-diameter portions of the valve rod 21, respectively. Therefore, when the valve rod 21 is vertically reciprocated, the lateral peripheral surface of the valve rod 21 does not contact an inner wall of the liquid chamber 59. In the second embodiment, the small-diameter space of the liquid chamber 59, which is positioned inside a tip 58a of the extended portion, constitutes the rod-tip insertion hole.

The nozzle attachment member 5 is screwed into the tip 58a of the extended portion. The valve seat 6 is arranged in an inner space of the nozzle attachment member 5 and is fixedly sandwiched between the tip 58a of the extended portion and the nozzle attachment member 5.

One end of a lateral flow path 59a is communicated with a lateral surface of the large-diameter space of the liquid chamber 59. The other end of the lateral flow path 59a is communicated with a liquid supply port 62 in the extension member 60 attached to lateral surface of the extended portion 58.

The extension member 60 is a block-like member including a liquid supply flow path 61 of which one end constitutes the liquid supply port 62. A liquid supply joint 63 is arranged at the other end of the liquid supply flow path 61. The liquid supply joint 63 is fluidly connected to the storage container (syringe) 2 to which the liquid material pressurized by the compressed-gas supply source (not illustrated) is supplied. The syringe 2 may be connected to the liquid supply joint 63 via a liquid feed tube, or directly coupled to the liquid supply joint 63. In the second embodiment, the syringe 2 is easily replaced because the valve rod 21 is not inserted into the syringe 2.

Other components are the same as those in the first embodiment, and hence description of those components is omitted.

Also in the discharge device 1 according to the second embodiment, a drop of liquid pressure caused near the lower end of the valve rod 21 and generation of bubbles due to the drop of liquid pressure can be suppressed by controlling the rising speed and the acceleration (acceleration and deceleration times in this embodiment) of the valve rod 21 operated by the actuator 28.

The discharge operation is similar to that in the first embodiment, and hence description of the discharge operation is omitted. The discharge device 1 according to the second embodiment is also mounted to the application device 101 and used in a negative pressure environment as in the first embodiment.

The above-described discharge device 1 according to the second embodiment can also suppress the generation of bubbles by controlling the rising speed and the acceleration of the valve rod 21 as in the first embodiment.

Furthermore, since the existing syringe 2 is connected using the extension member 60, maintenance work is easy to carry out.

Moreover, since the valve rod 21 is not inserted into the syringe 2, the length of the valve rod 21 can be shortened, and wobbling of the lower end of the valve rod 21 can be reduced.

Third Embodiment

Figure 9:
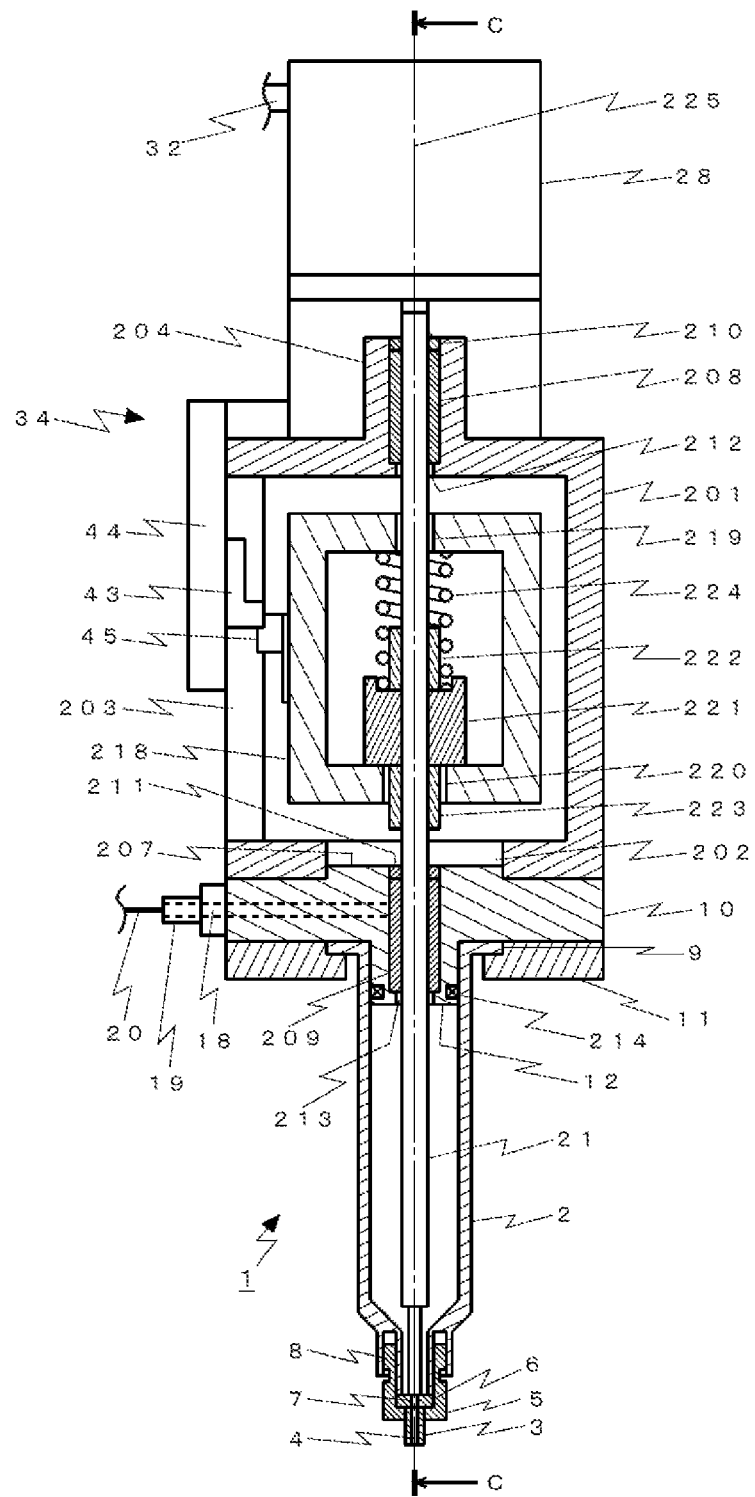
FIG. 9 is a partial sectional front view of a discharge device according to a third embodiment.
Figure 10:
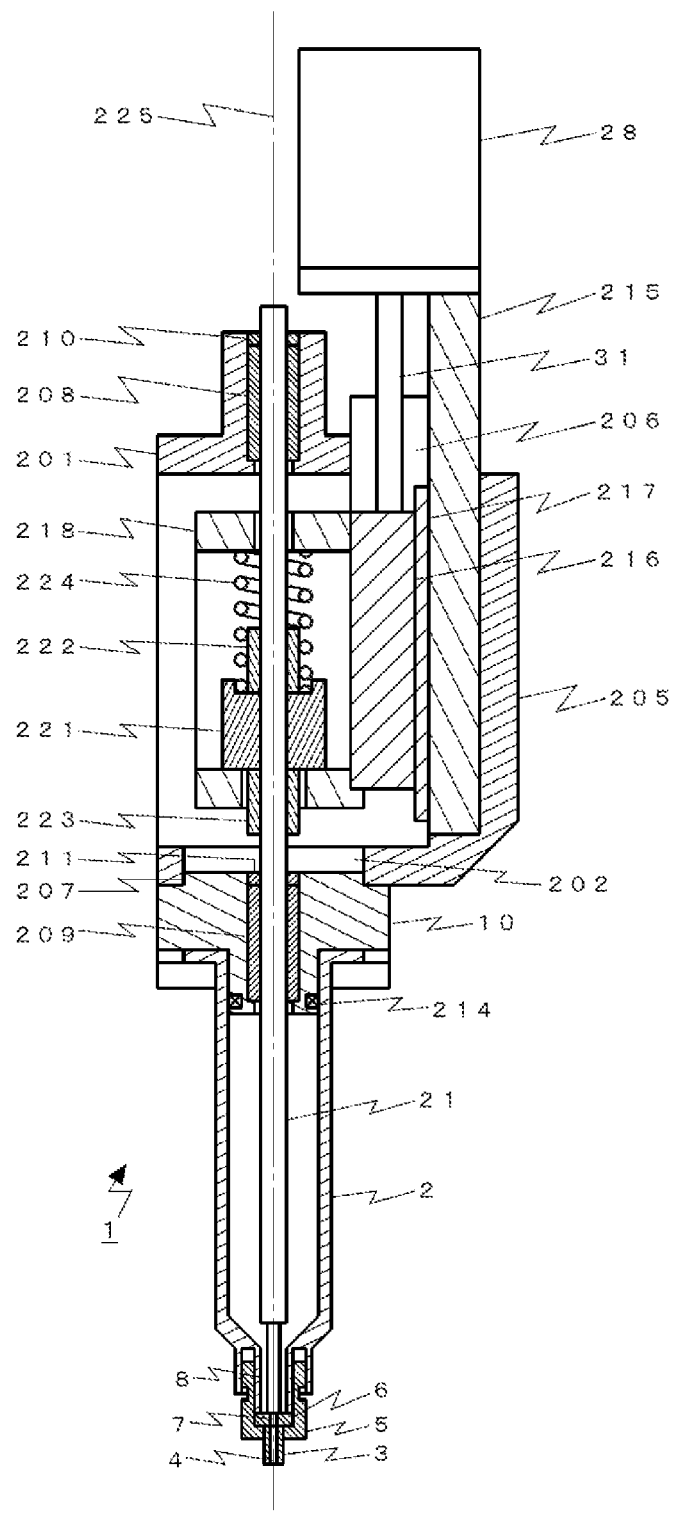
FIG. 10 is a sectional view taken along a line C-C in FIG. 9 when viewed in a direction denoted by arrow.

A liquid material discharge device 1 according to a third embodiment, illustrated in FIGS. 9 and 10, is mainly different from the first embodiment in that the discharge device includes an outer frame 201, an inner frame 218, a sensor 43, and a detection plate 45 attached to the inner frame, and that the sensor 43 detects valve closing in accordance with vertical movement of the inner frame. In the following, elements common to the first embodiment are denoted by the same reference numerals, and description of those elements is omitted in some cases.

<Structure>

FIG. 9 is a partial sectional front view of a discharge device according to a third embodiment. FIG. 10 is a sectional view taken along a line C-C in FIG. 9 when viewed in a direction denoted by arrow. The actuator side in FIG. 10 is called a "rear side", the side opposite to the actuator side relative to a central axis is called a "front side", and right and left surfaces positioned between a rear surface and a front surface are called "lateral surfaces" in some cases.

The valve rod 21 in the third embodiment is a linear member having a length extending from a position near the valve seat 6 to a position near the actuator 28, and is inserted through a first bushing 208, a second bushing 209, a rod conjunction member 221, a first fixing member 222, a second fixing member 223, and an elastic member 224.

The first bushing 208 and the second bushing 209 are tubular members for supporting the valve rod 21 while slidably contacting the outer peripheral surface of the valve rod 21, and they function as guide members to prevent wobbling of the valve rod 21. In other words, with guide of the first bushing 208 and the second bushing 209, straight-moving stability of the valve rod 21 is improved, and the contact position between the lower end of the valve rod 21 and the valve seat 6 is prevented from displacing. Thus, the tip of the valve rod 21 and the communication hole 7 in the valve seat 6 are positioned just in alignment with each other, and liquid leakage does not occur.

A space above the body lower member 10 is covered with a not-illustrated cover as in the first embodiment.

Components (such as the storage container 2, the nozzle 3, and the valve seat 6) included in the discharge device 1 according to the third embodiment and positioned under the body lower member 10 are similar to those in the discharge device 1 according to the first embodiment.

The body lower member 10 is a plate-like member including an insertion portion 12 projecting downward, a projected portion 207 projecting upward, and a second bushing insertion hole 213 into which the second bushing 209 extending vertically is disposed. The gas supply joint 19 is connected to one lateral surface of the body lower member 10.

The second bushing insertion hole 213 penetrates through a center of the body lower member 10 from an upper surface of the projected portion 207 to a lower surface of the insertion portion 12. A diameter of the second bushing insertion hole 213 is substantially equal to that of the second bushing 209, but a portion of the second bushing insertion hole 213 closer to its lower end has a diameter smaller than that of the second bushing 209 (and greater than that of the valve rod 21). A step formed by that portion supports the second bushing 209. A second bushing retainer 211 for fixedly holding the second bushing 209 is disposed at an upper end of the second bushing insertion hole 213.

A not-illustrated communication hole for communicating the inside of the syringe 2 and the compressed-gas flow path 18 with each other is formed in the insertion portion 12, and the compressed gas is supplied into the syringe 2 through the communication hole. A sealing member 214 for preventing leakage of the compressed gas to the outside is disposed over an outer surface of the insertion portion 12 near its lower end.

The outer frame 201 having a substantially rectangular parallelepiped shape with an inner space is disposed above the body lower member 10, and it includes a later-described position detection mechanism 34.

A fitting hole 202 is formed in a lower portion of the outer frame 201, and the projected portion 207 projecting from an upper surface of the body lower member 10 is fixedly fitted to the fitting hole 202.

An extension portion 204 is provided on an upper surface of the outer frame 201, and the first bushing 208 for supporting the valve rod 21 in a linearly movable manner is disposed in the extension portion 204. A first bushing insertion hole 212 in communication with the inner space of the outer frame 201 is disposed in the extension portion 204. As with the above-described second bushing insertion hole 213, the first bushing insertion hole 212 is also constituted by a large-diameter portion and a small-diameter portion, and a step between the large-diameter portion and the small-diameter portion supports the first bushing 208. A first bushing retainer 210 for fixedly holding the first bushing 208 is disposed at an upper end of the first bushing insertion hole 212. An opening 206 through which the actuator rod 31 and an actuator support member 215 are to be inserted is formed in an upper portion of the outer frame 201 on the rear side of the extension portion 204.

One lateral surface of the outer frame 201 (left lateral surface in FIG. 9, but it may be a right lateral surface without being limited to the left lateral surface) is opened, and an attachment plate 44 is disposed to cover the opened lateral surface over a certain size while forming an opening 203. The sensor 43 constituting the position detection mechanism 34 is fixedly disposed on an inner surface of the attachment plate 44. The sensor 43 in the third embodiment is a photosensor, but another type of sensor, such as a fiber sensor, a photoelectric sensor, or a vicinity sensor (of high-frequency oscillation type or capacitance type), may also be used as in the first embodiment. Details of detection operation will be described later.

The outer frame 201 is nearly entirely opened on the front side, and work for maintenance and adjustment can be performed through a front-side opening (see FIG. 10).

A rear portion 205 of the outer frame 201 is projected up to a more rearward position than the body lower member 10 (see FIG. 10). The actuator support member 215 in the form of a plate is disposed on the front (inner) side of the rear portion 205. The actuator support member 215 extends from a position near a lower end of a slider 216 to a position above the extension portion 204, and supports the actuator 28 above the outer frame 201. In this embodiment, the actuator 28 is constituted by a stepping motor equipped with a resolver, and the speed and the acceleration in operation of the valve rod 21 are controlled. However, the actuator 28 may be constituted by another type of motor as in the first embodiment.

The slider 216 capable of moving over a slide rail 217 is disposed on the front side of the actuator support member 215. The slider 216 is coupled to the actuator rod 31 and the inner frame 218.

The inner frame 218 is slightly smaller than the outer frame 201, and has a substantially rectangular parallelepiped shape with an inner space. The inner frame 218 is coupled to the slider 216, and functions as a slide member moving together with the slider 216.

The inner frame 218 is nearly entirely opened on the front side similarly to the outer frame 201.

A first through-hole 219 is formed in an upper portion of the inner frame 218, and a second through-hole 220 is formed in a lower portion of the inner frame 218. The valve rod 21 extends to pass through both the through-holes (219, 220). A diameter of the first through-hole 219 is greater than that of the valve rod 21, thus allowing the valve rod 21 to vertically move through the first through-hole 219 in non-contact relation. The second fixing member 223 having a smaller diameter than the second through-hole 220 is inserted through the second through-hole 220.

The rod conjunction member 221 is arranged in the inner space of the inner frame 218, and the valve rod 21 is fixedly inserted through a through-hole in the rod conjunction member 221. When the slider 216 is moved vertically, the inner frame 218 coupled to the slider 216 is moved together, whereby the valve rod 21 is also moved vertically via the rod conjunction member 221.

The rod conjunction member 221 is fixed to the valve rod 21 in a state that the first fixing member 222 and the second fixing member 223 tightly sandwiches the rod conjunction member 221 from above and below. More specifically, threads are formed in the outer peripheral surface of the valve rod 21 in its portions to which the fixing members (222, 223) are attached, and those threads can be meshed with threads formed in inner peripheral surfaces of the fixing members (222, 223). Therefore, the rod conjunction member 221 can be fixed to a desired position by adjusting positions of the fixing members (222, 223). The position of the rod conjunction member 221 is preferably adjusted such that, when the lower end of the valve rod 21 comes into contact with the valve seat 6 (namely, when it reaches the above-described contact position), a bottom surface of the rod conjunction member 221 comes into contact with an inner bottom surface (upper surface of the lower portion) of the inner frame 218 (as represented by a state illustrated in FIG. 9 or 10).

A method of fixing the rod conjunction member 221 is not limited to the above-described one. As in the first embodiment, the rod conjunction member 221 may be divided into two parts and fixed to the valve rod 21 by tightly sandwiching the valve rod 21 between the two parts from front and rear.

The elastic member 224 through which the valve rod 21 and the first fixing member 222 are inserted is disposed between the rod conjunction member 221 and a top surface of the inner frame 218. One end of the elastic member 224 is abutted against the top surface of the inner frame 218, and the other end of the elastic member 224 is abutted against an upper surface of the rod conjunction member 221, thus biasing the valve rod 21 downward via the rod conjunction member 221. A recess having substantially the same diameter as the elastic member 224 is formed in the upper surface of the rod conjunction member 221, and an end portion of the elastic member 224 is fitted to the recess to be supported in a not-displaceable manner. Unlike this embodiment, a recess having substantially the same diameter as the elastic member 224 may be formed in the top surface of the inner frame 218 against which the upper end of the elastic member 224 is abutted. The elastic member 224 in this embodiment is a compression coil spring and has repulsive (compressive) force Pii equivalent to the force that is required to move the valve rod 21, the rod conjunction member 221, the first fixing member 222, and the second fixing member 223.

A detection plate 45 is disposed on an outer lateral surface of the inner frame 218 in opposing relation to the sensor 43. As in the first embodiment, the detection plate 45 constitutes the position detection mechanism 34 in cooperation with the sensor 43. Unlike this embodiment, the sensor 43 may be arranged on the outer lateral surface of the inner frame 218, and the detection plate 45 may be disposed on the attachment plate 44 at a position opposing to the sensor 43.

In the third embodiment, since the first bushing 208, the elastic member 224, the rod conjunction member 221, the second bushing 209, the valve seat 6, and the nozzle 3 are disposed coaxially with a central axis 225 of the valve rod 21, no moment load is applied to the valve rod 21. Therefore, straight-moving stability of the valve rod 21 is improved, wobbling of the lower end of the valve rod 21 is reduced, and displacement of the contact position between the valve rod 21 and the valve seat 6 is reduced. In other words, the tip of the valve rod 21 can reliably close the communication hole 7 in the valve seat 6, and liquid leakage does not occur in the valve-closed state.

Furthermore, the bushings (208, 209) for supporting the valve rod 21 in a linearly movable manner are arranged not only in a central portion of the valve rod 21 (as represented by the second bushing 209), but also in an end portion of the valve rod 21 (as represented by the first bushing 208). That arrangement contributes to further improving the straight-moving stability of the valve rod 21, reducing the wobbling of the lower end of the valve rod 21, and reducing the displacement of the contact position between the valve rod 21 and the valve seat 6.

In addition, the wobbling of the lower end of the valve rod 21 can be further reduced in some cases by setting a distance between from the first bushing 208 to the second bushing 209 substantially equal to a distance from the second bushing 209 to a valve-closed point (i.e., the contact point between the end of the valve rod 21 and the valve seat 6).

<Operations>

Figure 11:
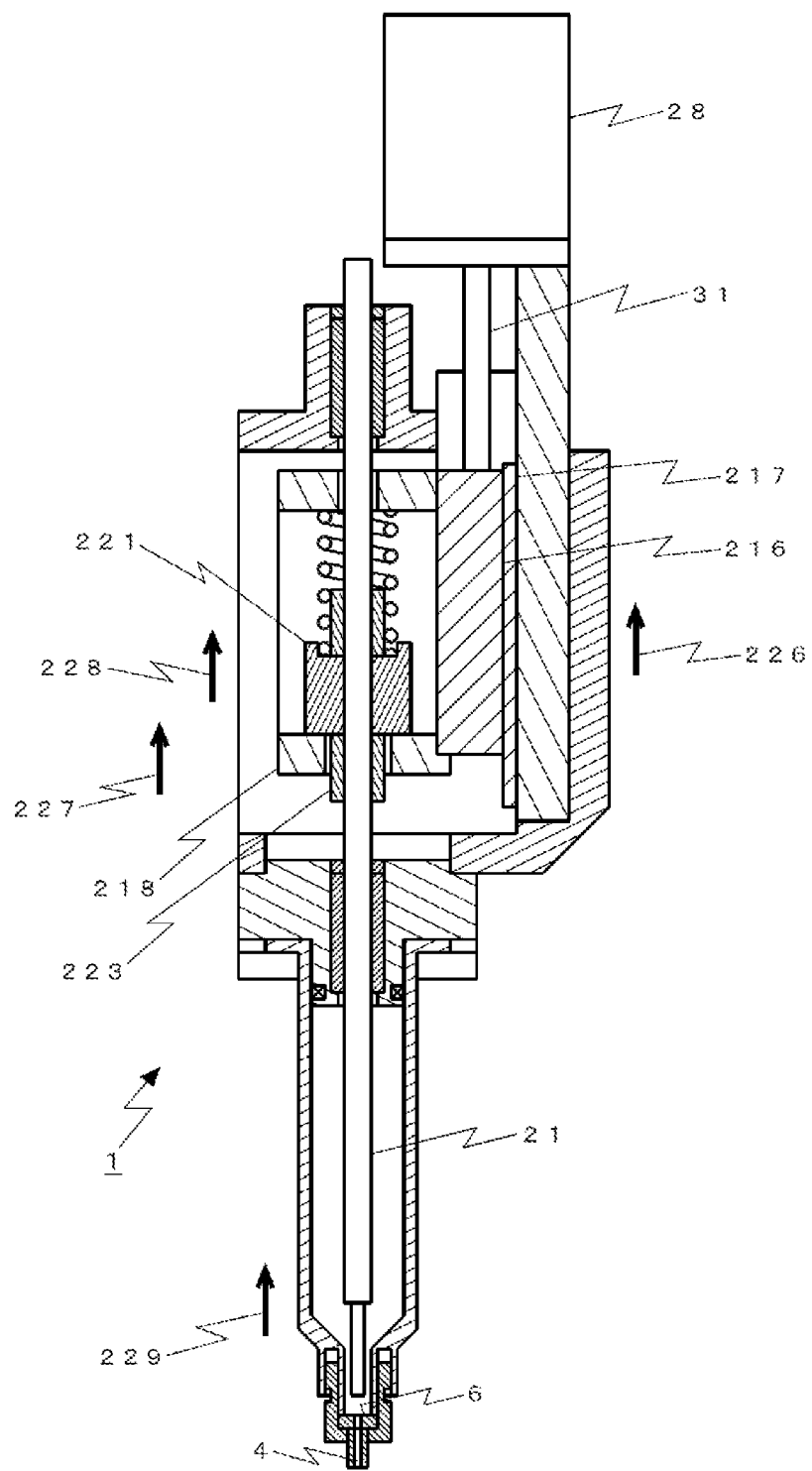
FIG. 11 is an explanatory view referenced to explain an operation of raising the valve rod in the discharge device according to the third embodiment.
Figure 12:
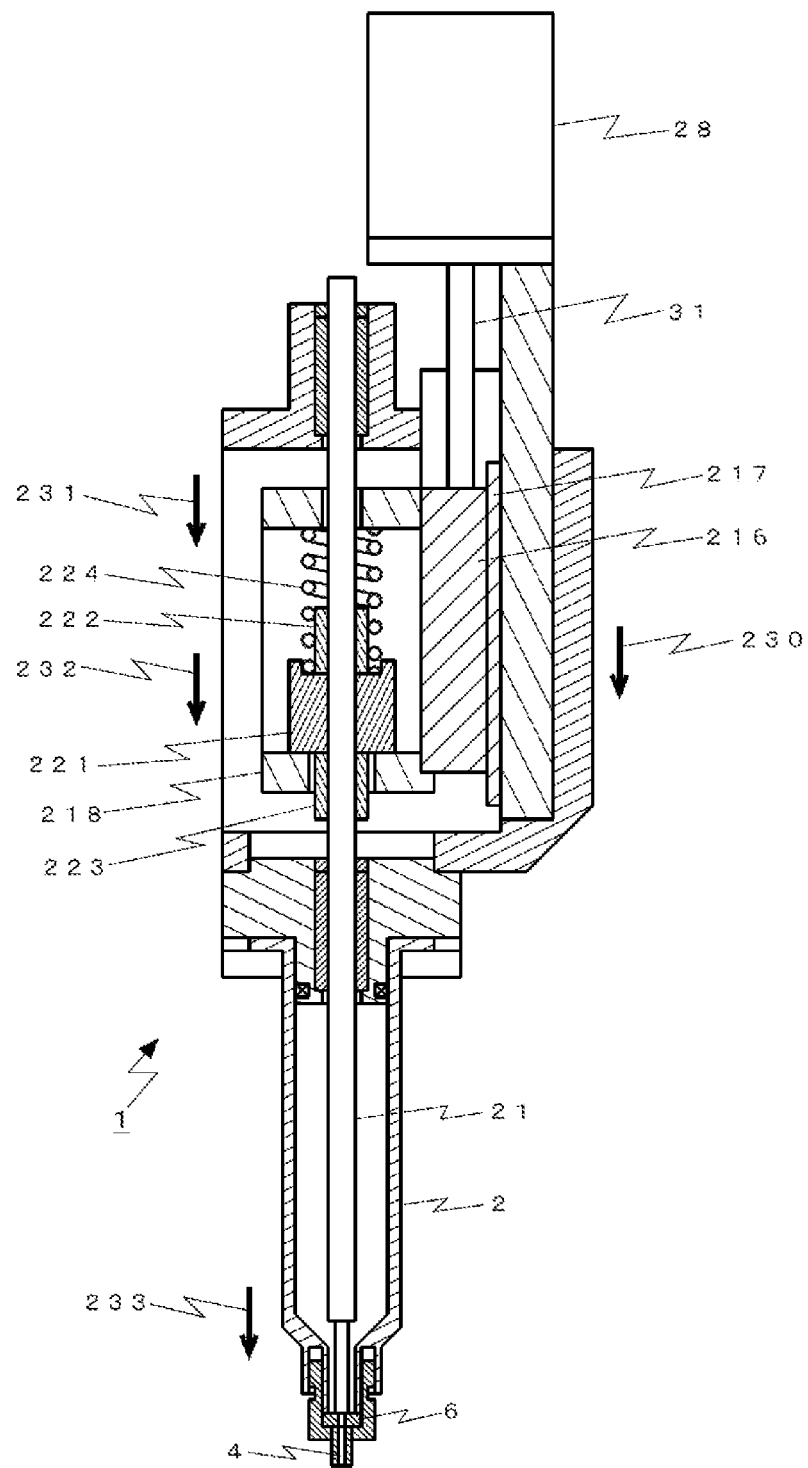
FIG. 12 is an explanatory view referenced to explain an operation of lowering the valve rod in the discharge device according to the third embodiment.
Figure 13:
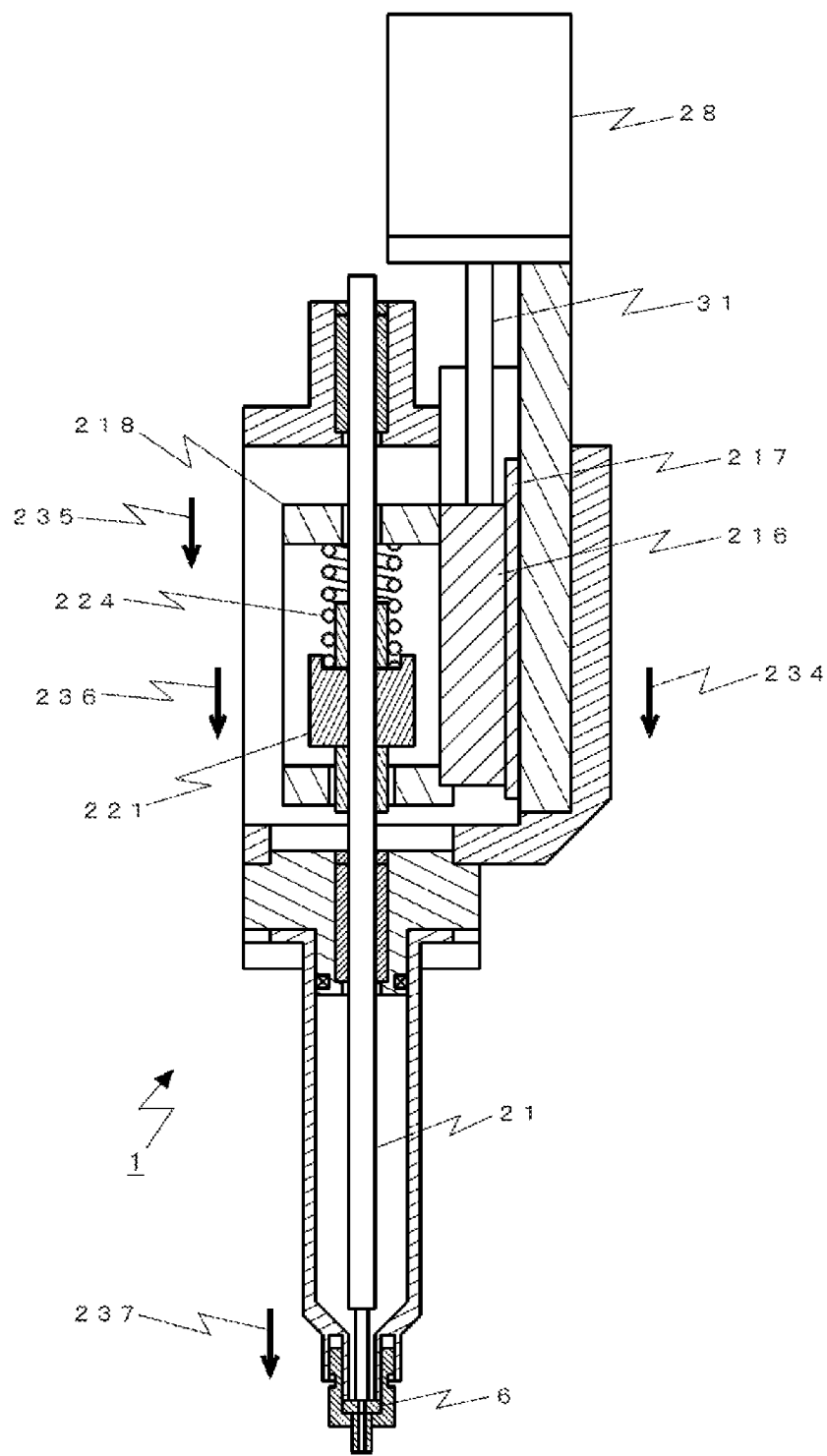
FIG. 13 is an explanatory view referenced to explain an operation of detecting contact of the valve rod in the discharge device according to the third embodiment.

Operations of the discharge device 1 according to the third embodiment will be described below with reference to FIGS. 11, 12 and 13.

(Raising Operation)

First, an operation of raising the valve rod 21 from a position where the lower end of the valve rod 21 contacts the valve seat 6 is described with reference to FIG. 11. When the actuator 28 is operated to contract the actuator rod 31, the slider 216 connected to the actuator rod 31 rises (as denoted by numeral 226). With rising of the slider 216, the inner frame 218 fixed to the slider 216 rises together (as denoted by numeral 227). With rising of the inner frame 218, the inner bottom surface of the inner frame 218 causes the rod conjunction member 221 to rise together (as denoted by numeral 228), and hence the valve rod 21 held by the rod conjunction member 221 also rises (as denoted by numeral 229). Upon the lower end of the valve rod 21 departing away from the valve seat 6, the liquid material having passed through the discharge flow path 4 flows out from the discharge port.

(First Lowering Operation)

An operation of lowering the valve rod 21 until the lower end of the valve rod 21 contacts the valve seat 6 is now described with reference to FIG. 12. When the actuator 28 is operated to extend the actuator rod 31 downward, the slider 216 lowers (as denoted by numeral 230). With lowering of the slider 216, the inner frame 218 fixed to the slider 216 lowers together (as denoted by numeral 231), thus causing the rod conjunction member 221 to lower via the elastic member 224 (as denoted by numeral 232). On that occasion, since the strength (Pii) of the compression spring constituting the elastic member 224 is set to be equivalent to the force that is required to move the valve rod 21, the rod conjunction member 221, the first fixing member 222, and the second fixing member 223, the spring 224 is substantially not contracted (thus, the bottom surface of the rod conjunction member 221 is kept in contact with the inner bottom surface of the inner frame 218 during the first lowering operation).

With lowering of the rod conjunction member 221, the valve rod 21 also lowers (as denoted by numeral 233), and the lower end of the valve rod 21 comes into contact with the valve seat 6. Accordingly, the communication between the discharge flow path 4 and the storage container 2 is cut off, whereby the liquid material is stopped from flowing out from the discharge port.

(Second Lowering Operation)

A lowering operation of bringing the position of the valve rod 21 into a safely closed position is now described with reference to FIG. 13. When the actuator rod 31 continues to extend downward after the lower end of the valve rod 21 has come into contact with the valve seat 6, the slider 216 further lowers (as denoted by numeral 234), and the inner frame 218 fixed to the slider 216 also lowers together (as denoted by numeral 235). With lowering of the inner frame 218, the detection plate 45 attached to the inner frame 218 departs away from the sensor 43. Upon detecting such a state, the sensor 43 sends a detection signal to the discharge control device 33. The discharge control device 33 stores, as the initial detected position (or the contact position), a position where the detection plate 45 departs away from the sensor 43.

When the slider 216 lowers in the state that the lower end of the valve rod 21 is in contact with the valve seat 6 as described above, the elastic member 224 is contracted and generates repulsive force acting to bias the rod conjunction member 221 downward (as denoted by numeral 236). The biasing force acts to press the valve rod 21 against the valve seat 6 (as denoted by numeral 237), thereby, as in the first embodiment, bringing the actuator rod 31 into the safely closed position where it is further lowered from the initial detected position by a predetermined distance (e.g., 1 mm). As a result, closing of the valve seat 6 by the valve rod 21 is ensured.

The discharge operation is similar to that in the first embodiment, and hence description of the discharge operation is omitted. The discharge device 1 according to the third embodiment is also mounted to the application device 101 and used in a negative pressure environment as in the first embodiment.

The above-described discharge device 1 according to the third embodiment can also suppress, as in the first embodiment, a drop of liquid pressure caused near the lower end of the valve rod 21 and generation of bubbles due to the drop of liquid pressure.

Fourth Embodiment

Figure 14:
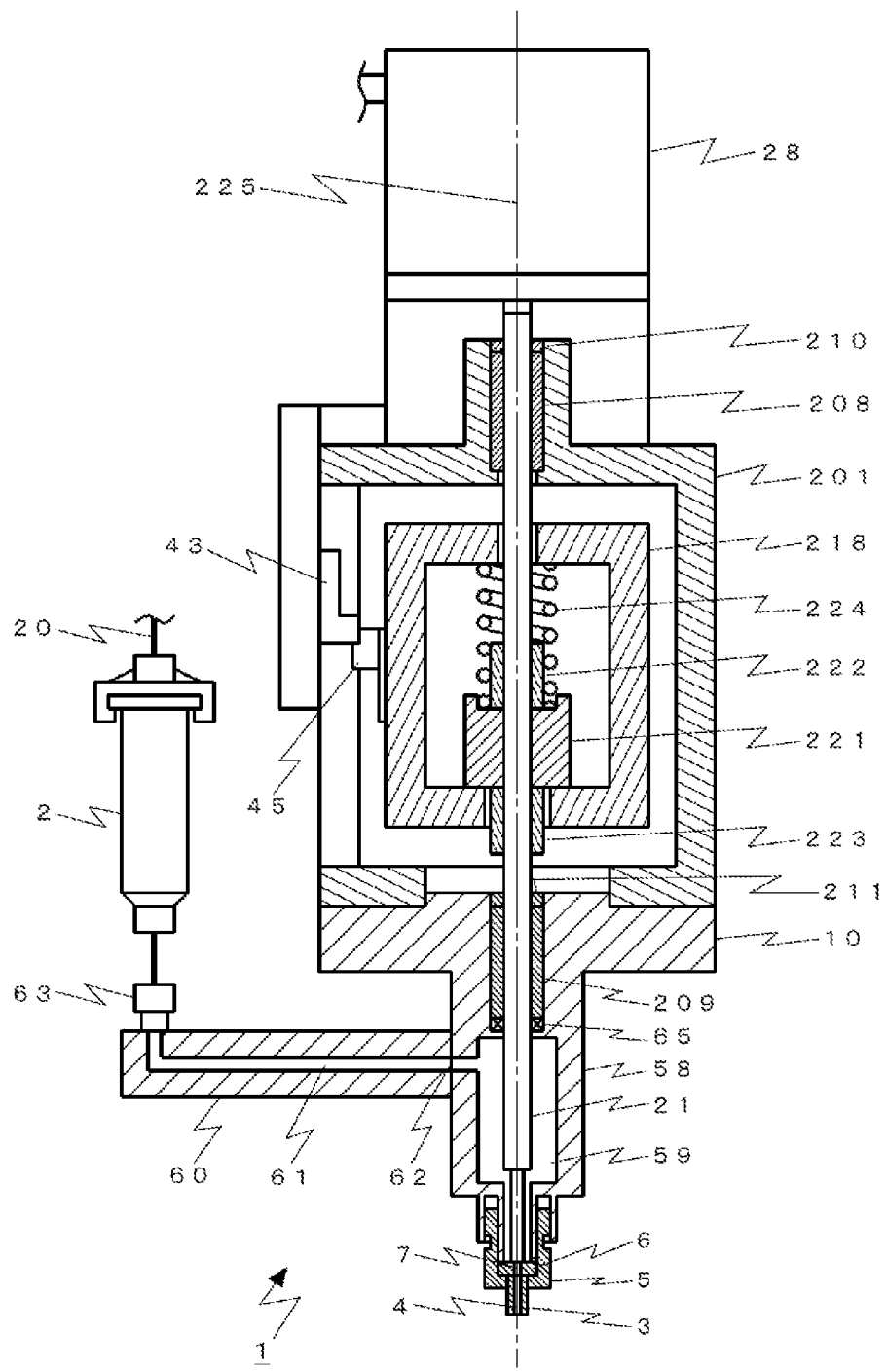
FIG. 14 is a partial sectional front view of a discharge device according to a fourth embodiment.

A liquid material discharge device 1 according to a fourth embodiment, illustrated in FIG. 14, is similar to the third embodiment in that the discharge device includes the outer frame 201, the inner frame 218, the sensor 43, and the detection plate 45 attached to the inner frame, and that the sensor 43 detects valve closing in accordance with vertical movement of the inner frame, but it is mainly different from the third embodiment in including the extension member 60 similar to that in the second embodiment. In the following, elements common to the third embodiment are denoted by the same reference numerals, and description of those elements is omitted in some cases.

As in the third embodiment, the fourth embodiment includes the valve rod 21 having a length extending to a position near the actuator 28, the first bushing 208, the second bushing 209, the rod conjunction member 221, the first fixing member 222, the second fixing member 223, and the elastic member 224 through all of which the valve rod 21 is inserted. With guide of the first bushing 208 and the second bushing 209, straight-moving stability of the valve rod 21 is improved, and the contact position between the lower end of the valve rod 21 and the valve seat 6 is prevented from displacing.

The fourth embodiment further includes, as in the second embodiment, the extension member 60 for fluid communication between the syringe 2 and liquid chamber 59. According to the fourth embodiment, since the valve rod 21 is not inserted into the syringe 2, the length of the valve rod 21 can be shortened, and wobbling of the lower end of the valve rod 21 can be reduced.

Other components are the same as those in the second embodiment or the third embodiment, and hence description of those components is omitted.

The discharge operation is similar to that in the third embodiment, and hence description of the discharge operation is omitted. The discharge device 1 according to the fourth embodiment is also mounted to the application device 101 and used in a negative pressure environment as in the first to third embodiments.

The above-described discharge device 1 according to the fourth embodiment can also suppress the generation of bubbles by controlling the rising speed and the acceleration of the valve rod 21 as in the first to third embodiments.

Moreover, since the existing syringe 2 is connected using the extension member 60, maintenance work is easy to carry out.

Fifth Embodiment

The fifth embodiment relates to a discharge device 1 including a rod support mechanism 238 for supporting the small-diameter portion of the valve rod.

Figure 15:
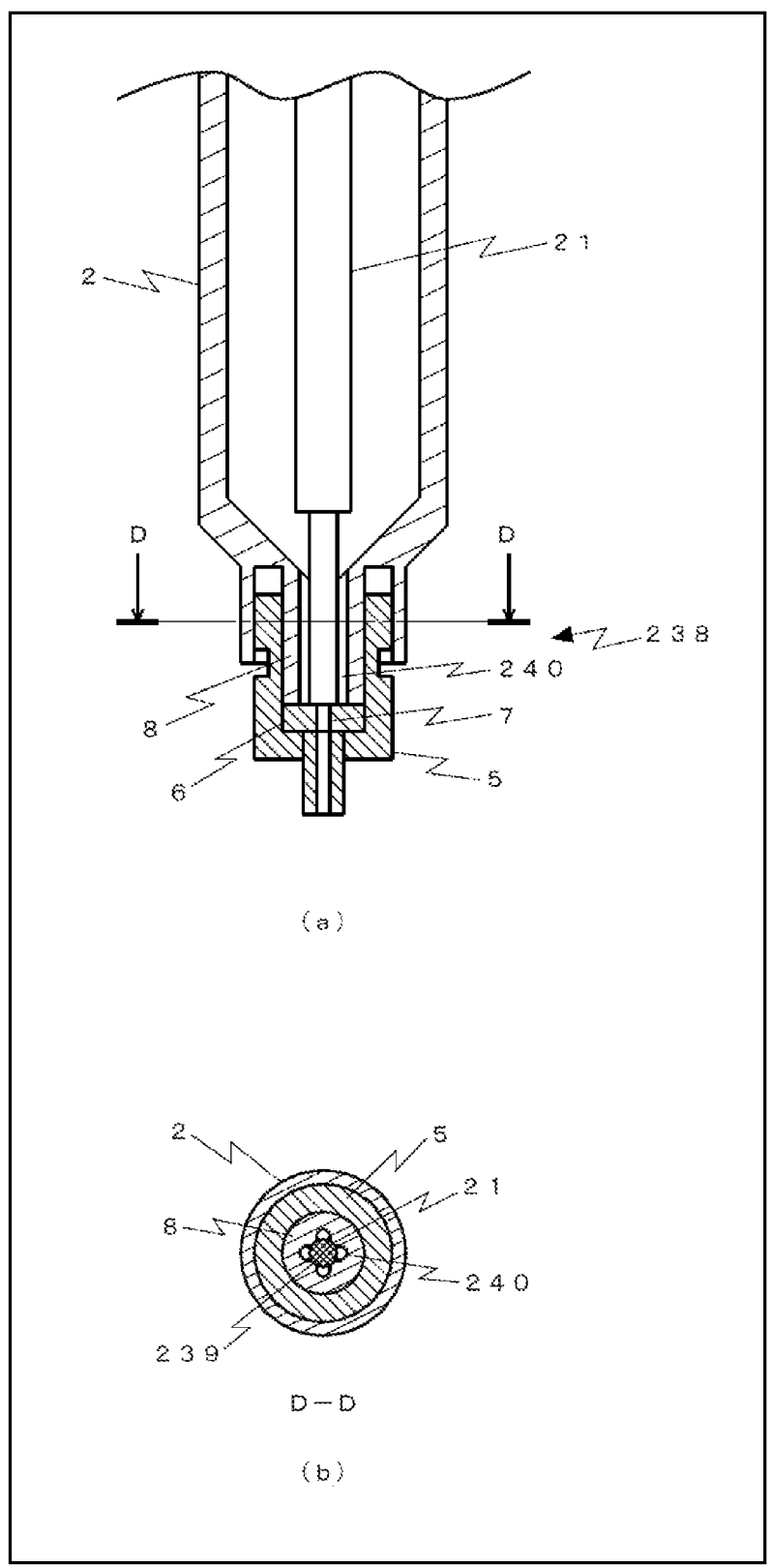
FIG. 15 is a partial sectional view of a discharge device according to a fifth embodiment.

FIG. 15 is a partial sectional view of the discharge device according to the fifth embodiment. In FIG. 15, (a) is a front view, and (b) is a sectional view taken along a line D-D in (a) when viewed in a direction denoted by arrow. FIG. 15(a) illustrates the lower end and thereabout of the valve rod in an enlarged scale.

As illustrated in FIG. 15(a), the discharge device 1 according to the fifth embodiment includes the rod support mechanism 238 that is formed inside the inner tube 8 of the syringe 2 over an entire length of the inner tube 8. The rod support mechanism 238 includes four rod-support slide portions 239 and four communication grooves 240.

As illustrated in FIG. 15(b), the four rod-support slide portions 239 and the four communication grooves 240 are arranged in the form of a ring at equal intervals. Respective inner peripheral surfaces of the rod-support slide portions 239 and the communication grooves 240 define an inner peripheral surface of the inner tube 8.

As in the first to fourth embodiments, the valve rod 21 is a step-formed rod having a smaller diameter near its lower end. The four rod-support slide portions 239 function as guide members for improving the straight-moving stability of the valve rod 21 by supporting the small-diameter portion of the valve rod 21 while slidably contacting an outer peripheral surface thereof. The communication grooves 240 for communicating the large-diameter portion of the syringe 2 and the communication hole 7 in the valve seat 6 with each other are each disposed between adjacent two of the rod-support slide portions 239. The liquid material stored in the large-diameter portion of the syringe 2 is supplied to the communication hole 7 through the four communication grooves 240.

While the four rod-support slide portions 239 and the four communication grooves 240 are provided in this embodiment, the numbers of those components are not limited to four, and they may be 2, 3, or 5 or more. When the plural rod-support slide portions 239 and the plural communication grooves 240 are arranged, they are preferably arranged at equal intervals.

While, in this embodiment, the rod support mechanism 238 is formed integrally with the inner tube 8 of the syringe 2, the rod support mechanism 238 may be constituted by a separate part and may be attached to the existing syringe 2 later.

According to this embodiment, since the rod support mechanism 238 is disposed near the lower end of the valve rod 21 (i.e., near the contact position between the valve rod 21 and the valve seat 6), it is possible to reduce the wobbling of the lower end of the valve rod 21, and hence to reduce the displacement of the contact position between the valve rod 21 and the valve seat 6. As a result, the communication hole 7 in the valve seat 6 can be reliably closed by the lower end of the valve rod 21.

The rod support mechanism 238 in this embodiment can be applied to any of the above-described first to fourth embodiments. In particular, when the rod support mechanism 238 is applied to the third or fourth embodiment, the straight-moving stability of the valve rod 21 can be significantly improved because the valve rod 21 is guided at three points by the first bushing 208, the second bushing 209, and the rod support mechanism 238, which are arranged in spaced relation along the length direction of the valve rod 21.

Sixth Embodiment

The sixth embodiment relates to a discharge device 1 including a rod support mechanism 238 for supporting the large-diameter portion of the valve rod.

Figure 16:
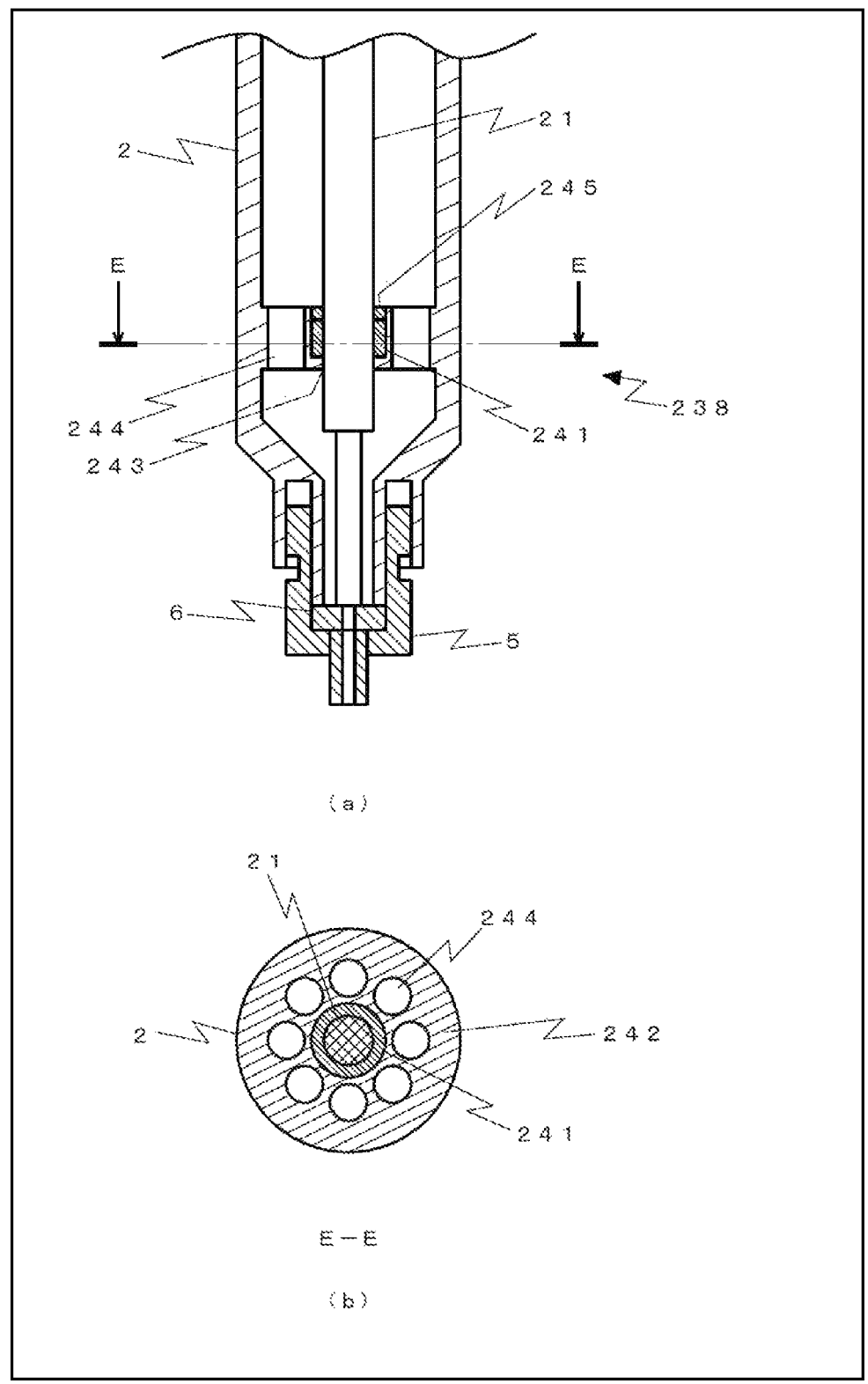
FIG. 16 is a partial sectional view of a discharge device according to a sixth embodiment.

FIG. 16 is a partial sectional view of the discharge device according to the sixth embodiment. In FIG. 16, (a) is a front view, and (b) is a sectional view taken along a line E-E in (a) when viewed in a direction denoted by arrow. FIG. 16(a) illustrates the lower end and thereabout of the valve rod in an enlarged scale.

In the discharge device 1 according to the sixth embodiment, the rod support mechanism 238 for supporting the valve rod 21 is disposed in the large-diameter portion of the syringe 2 above the inner tube 8. The rod support mechanism 238 includes a third bushing 241, a partition member 242 having a third bushing insertion hole 243 and liquid communication holes 244, and a third bushing retainer 235.

The third bushing 241 is a tubular member for supporting the valve rod 21 while slidably contacting its outer peripheral surface, and it functions as a guide member to prevent wobbling of the valve rod 21.

The partition member 242 is a plate-like member having the third bushing insertion hole 243 formed at a center, and eight liquid communication holes 244 arranged at equal intervals around the third bushing insertion hole 243.

The third bushing 241 is fitted to the third bushing insertion hole 243 and is fixedly held by the third bushing retainer 235. The large-diameter portion of the syringe 2 is partitioned into an upper space and a lower space by the partition member 242, but the liquid material is supplied from the upper space to the lower space through the liquid communication holes 244.

A diameter size of each of the liquid communication holes 244 is set to such a value as enabling the liquid material to be sufficiently supplied while allowing the partition member 242 to maintain the strength enough to support the valve rod 21. The number of the liquid communication holes 244 is not limited to eight, and it may be set to a desired number (preferably plural). When the plural liquid communication holes 244 are provided, they are preferably arranged at equal intervals about the center of the syringe 2.

While, in this embodiment, the rod support mechanism 238 is formed integrally with the large-diameter portion of the syringe 2, the rod support mechanism 238 may be constituted by a separate part and may be attached to the existing syringe 2 later.

According to this embodiment, since the rod support mechanism 238 is disposed in the large-diameter portion of the valve rod 21, it is possible to reduce the wobbling of the lower end of the valve rod 21, and hence to reduce the displacement of the contact position between the valve rod 21 and the valve seat 6.

The rod support mechanism 238 in this embodiment can be applied to any of the above-described first to fourth embodiments. In particular, when the rod support mechanism 238 is applied to the third or fourth embodiment, the straight-moving stability of the valve rod 21 can be significantly improved because the valve rod 21 is guided by the three bushings that are arranged in spaced relation along the length direction of the valve rod 21.

LIST OF REFERENCE SIGNS

1: discharge device, 2: storage container/syringe, 3: nozzle, 4: discharge flow path, 5; nozzle attachment member, 6: valve seat, 7: communication hole, 8: inner tube (rod-tip insertion hole), 9: flange, 10: body lower member, 11: flange support member, 12: insertion portion, 13: through-hole, 14: projected portion, 15: sealing member A, 16: sealing member B, 17: seal retainer, 18: compressed-gas flow path, 19: gas supply joint, 20: compressed-gas supply pipe, 21: valve rod, 22: rod holder A, 23: rod holder B, 24: fastener, 25: coupling member, 26: drive transmission member, 27: fixing member, 28: actuator, 29: actuator attachment plate, 30: actuator support plate, 31: actuator rod, 32: control wiring, 33: discharge control device, 34: position detection mechanism, 36: slide rail, 37: upper slide block (rod conjunction member), 38: lower slide block, 39: slide attachment plate, 40: upper pin, 41: lower pin, 42: elastic member (spring), 43: sensor, 44: attachment plate, 45: detection plate, 47: head cover, 48: rising of actuator rod, 49: rising of lower slide block, 50: rising of upper slide block, 51: rising of valve rod, 52: lowering of actuator rod, 53: lowering of lower slide block, 54: lowering of upper slide block, 55: lowering of valve rod, 56: lowering of actuator rod, 57: lowering of lower slide block, 58: extended portion, 59: liquid chamber, 60: extension member, 61: liquid supply flow path, 62: liquid supply port, 63: liquid supply joint, 64: sealing member C, 65: sealing member D, 101: application device, 102: base, 103: application target/workpiece, 104: table, 105: X driving device, 106: Y driving device, 107: Z driving device, 108: X moving direction, 109: Y moving direction, 110: Z moving direction, 111: drive control device, 112: cover, 201: outer frame, 202: fitting hole, 203: opening (lateral surface), 204: extension portion, 205: rear portion, 206: opening (rear surface), 207: projected portion, 208: first bushing, 209: second bushing, 210: first bushing retainer, 211: second bushing retainer, 212: first bushing insertion hole, 213: second bushing insertion hole, 214: sealing member, 215: actuator support member, 216: slider, 217: slide rail, 218: inner frame, 219: first through-hole, 220: second through-hole, 221: rod conjunction member, 222: first fixing member, 223: second fixing member, 224: elastic member, 225: central axis, 226: rising of slider, 227: rising of inner frame, 228: rising of rod holder, 229: rising of valve rod, 230: lowering of slider, 231: lowering of inner frame, 232: lowering of rod holder, 233: lowering of valve rod, 234: lowering of slider, 235: lowering of inner frame, 236: force biasing rod holder downward, 237: force pressing valve rod against valve seat, 238: rod support mechanism, 239: rod-support slide portion, 240: communication groove, 241: third bushing, 242: partition member, 243: third bushing insertion hole, 244: liquid communication hole, 245: third bushing retainer

The invention claimed is:

1. A liquid material discharge device comprising:
a storage container storing a liquid material;
a compressed-gas supply source pressurizing the storage container;
a nozzle having a discharge flow path;
a reciprocating valve rod;
a slide member connected to the valve rod;
an actuator reciprocating the slide member;
a valve seat having a communication hole that is communicated with the discharge flow path; and
a discharge control device controlling the actuator to open and close the communication hole by a tip of the valve rod, wherein the liquid material discharge device further comprises a position detection mechanism detecting that the tip of the valve rod is at a contact position at which the tip contacts the valve seat,
wherein when the actuator is operated to lower the slide member, the slide member is configured to be further lowered after the tip of the valve rod reaches the contact position without lowering the valve rod, and
wherein the discharge control device is configured to move the valve rod to a safely closed position at which the valve rod is further lowered from the contact position by a predetermined distance.

2. The liquid material discharge device according to claim 1, wherein the position detection mechanism includes a sensor mechanism detecting that the slide member is at a predetermined position, and detects, by detecting a position of the slide member, that the tip of the valve rod is at the contact position.

3. The liquid material discharge device according to claim 2,
wherein the liquid material discharge device further comprises:

a rod conjunction member connected to the valve rod and arranged in contact with the slide member in a separable manner; and an elastic member applying biasing force to keep the rod conjunction member and the slide member contacted with each other in a separable manner, wherein, when force acting to further advance the valve rod is applied by the actuator after the valve rod has come into contact with the valve seat, the slide member is moved downward away from the rod conjunction member, and the tip of the valve rod being at the contact position at which the tip contacts the valve seat is detected by detecting the downward movement of the slide member with the sensor mechanism.

4. The liquid material discharge device according to claim 3, wherein the rod conjunction member is connected to the slide member, and the elastic member is a tension coil spring coupling the rod conjunction member and the slide member.

5. The liquid material discharge device according to claim 4, wherein the elastic member has tensile force Pi equivalent to force that is able to move the rod conjunction member and the slide member when the valve rod and the valve seat are not in contact with each other.

6. The liquid material discharge device according to claim 3, wherein the slide member has a top surface including a first through-hole through which the valve rod is inserted, and a bottom surface including a second through-hole through which the valve rod is inserted, the rod conjunction member and the elastic member are arranged between the top surface and the bottom surface of the slide member, and the elastic member keeps the rod conjunction member contacted with the top surface or the bottom surface of the slide member in a separable manner.

7. The liquid material discharge device according to claim 6, further comprising a fixing member through which the valve rod is inserted, and which fixedly holds the rod conjunction member, wherein the elastic member is a compression coil spring through which the valve rod is inserted.

8. The liquid material discharge device according to claim 7, wherein the elastic member has repulsive force Pii equivalent to force that is required to move the valve rod, the rod conjunction member, and the fixing member.

9. The liquid material discharge device according to claim 1, wherein the actuator includes, as a drive source, a motor capable of controlling an advanced position of the valve rod with the discharge control device, and the tip of the valve rod being at the contact position is detected by utilizing the advanced or retracted position of the valve rod.

10. The liquid material discharge device according to claim 1, wherein the discharge control device controls an acceleration time $A_u$ in rising of the valve rod by the actuator to be held within a range of 2 to 300 [ms].

11. The liquid material discharge device according to claim 10, wherein the discharge control device controls an acceleration time $A_d$ in lowering of the valve rod by the actuator to be held within a range of 2 to 300 [ms].

12. The liquid material discharge device according to claim 11, wherein the discharge control device sets the acceleration time $A_u$ in the rising of the valve rod and the acceleration time $A_d$ in the lowering of the valve rod by the actuator to be the same.

13. The liquid material discharge device according to claim 1, wherein the discharge control device controls a target speed $V_1$ in the rising of the valve rod by the actuator to be held within a range of 0.2 to 30 [mm/s].

14. The liquid material discharge device according to claim 1, wherein the actuator is driven by using, as a drive source, one selected from among a stepping motor, a servomotor, and a linear motor.

15. The liquid material discharge device according to claim 1, further comprising:

a first guide member through which the valve rod is inserted, and which guides straight movement of the valve rod; and a second guide member through which the valve rod is inserted, and which guides the straight movement of the valve rod at a position lower than the first guide member.

16. The liquid material discharge device according to claim 15, further comprising a third guide member through which the valve rod is inserted, and which guides the straight movement of the valve rod at a position lower than the second guide member.

17. An application device comprising:
the liquid material discharge device according to claim 1;
a worktable on which a workpiece is to be placed;
a relative driving device moving the liquid material discharge device and the worktable relatively to each other;
a cover constituting a negative pressure space in which the liquid material discharge device, the worktable, and the relative driving device are arranged;
a depressurization device producing negative pressure inside the cover; and
a drive control device controlling the relative driving device.

18. The application device according to claim 17, wherein the depressurization device is a vacuum pump.

19. An application method using the application device according to claim 17, wherein the liquid material is applied onto the workpiece while the workpiece and the liquid material discharge device are moved relatively to each other in a state that an inner space of the cover is held under negative pressure by the depressurization device.

20. The application method according to claim 19, wherein the inner space of the cover is substantially under a vacuum.

21. The liquid material discharge device according to claim 1, wherein the actuator reciprocates the slide member to open and close the communication hole by the tip of the valve rod.

* * * * *